(12) United States Patent
Lee et al.

(10) Patent No.: US 10,101,844 B2
(45) Date of Patent: Oct. 16, 2018

(54) MOBILE TERMINAL AND METHOD OF CONTROLLING THE SAME BASED ON TYPE OF TOUCH OBJECT USED TO APPLY TOUCH INPUT

(71) Applicant: LG ELECTRONICS INC., Seoul (KR)

(72) Inventors: Jaehun Lee, Seoul (KR); Younghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 14/621,131

(22) Filed: Feb. 12, 2015

(65) Prior Publication Data

US 2015/0261378 A1    Sep. 17, 2015

(30) Foreign Application Priority Data

Mar. 14, 2014  (KR) .................. 10-2014-0030461
May 22, 2014   (KR) .................. 10-2014-0061718

(51) Int. Cl.
*G06F 3/00*    (2006.01)
*G06F 3/041*   (2006.01)
(Continued)

(52) U.S. Cl.
CPC ........ *G06F 3/0416* (2013.01); *G06F 3/03545* (2013.01); *G06F 3/044* (2013.01); *G06F 3/0482* (2013.01); *G06F 3/04842* (2013.01); *G06F 3/04883* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

2007/0250786 A1* 10/2007 Jeon ................ G06F 3/0482
                                                 715/765
2010/0265185 A1* 10/2010 Oksanen ........... G06F 3/0488
                                                 345/173
(Continued)

FOREIGN PATENT DOCUMENTS

CN      102859325      1/2013
EP       2560076       2/2013
(Continued)

OTHER PUBLICATIONS

European Patent Office Application Serial No. 15158183.2, Search Report dated Jul. 15, 2015, 6 pages.
(Continued)

*Primary Examiner* — Toan Vu
(74) *Attorney, Agent, or Firm* — Lee, Hong, Degerman, Kang & Waimey

(57) ABSTRACT

Provided is a mobile terminal including: a touch screen; a controller that identifies a type of touch object with which a touch input is applied to the touch screen, and provides a touch input method that differs according to a type of the identified touch object, in which the controller identifies the touch object based on at least one among strength of a signal that is detected on the touch screen when the touch input is applied and on a distributed state of regions on which the signal is detected.

19 Claims, 14 Drawing Sheets

(51) Int. Cl.
*G06F 3/044* (2006.01)
*G06F 3/0354* (2013.01)
*G06F 3/0482* (2013.01)
*G06F 3/0484* (2013.01)
*G06F 3/0488* (2013.01)
*G06F 3/01* (2006.01)

(56) References Cited

U.S. PATENT DOCUMENTS

| | | | | |
|---|---|---|---|---|
| 2011/0320977 | A1* | 12/2011 | Bahn | G06F 3/0481 715/810 |
| 2012/0096376 | A1* | 4/2012 | Hibi | G06F 3/03545 715/765 |
| 2012/0182296 | A1* | 7/2012 | Han | G06F 3/04883 345/419 |
| 2012/0268411 | A1 | 10/2012 | Chen et al. | |
| 2012/0306772 | A1* | 12/2012 | Tan | G06F 3/0488 345/173 |
| 2013/0093705 | A1 | 4/2013 | Huang | |
| 2013/0113704 | A1* | 5/2013 | Sarrafzadeh | G06F 3/033 345/158 |
| 2013/0290906 | A1* | 10/2013 | Thorsander | G06F 3/0488 715/835 |
| 2014/0002340 | A1* | 1/2014 | Jordan | G06F 3/044 345/156 |
| 2014/0188932 | A1* | 7/2014 | Kalita | G06Q 10/10 707/770 |
| 2014/0240261 | A1* | 8/2014 | Heo | G06F 3/041 345/173 |
| 2014/0253444 | A1* | 9/2014 | Cheng | G06F 3/04883 345/158 |
| 2014/0267085 | A1* | 9/2014 | Li | G06F 3/041 345/173 |
| 2014/0327626 | A1* | 11/2014 | Harrison | G06F 3/0416 345/173 |
| 2014/0337786 | A1* | 11/2014 | Luo | G06F 3/0416 715/773 |
| 2015/0026613 | A1* | 1/2015 | Kwon | G06F 3/04886 715/764 |
| 2015/0186005 | A1* | 7/2015 | Roper | G06F 3/04842 715/765 |

FOREIGN PATENT DOCUMENTS

| | | |
|---|---|---|
| JP | 2012-123678 | 6/2012 |
| KR | 10-2013-0007230 | 1/2013 |
| KR | 10-2013-0024742 | 3/2013 |

OTHER PUBLICATIONS

Korean Intellectual Property Office Application Serial No. 10-2014-0061718, Office Action dated Sep. 15, 2015, 4 pages.
The State Intellectual Property Office of the People's Republic of China Application Serial No. 201510111880.4, Office Action dated Jul. 13, 2017, 15 pages.

* cited by examiner

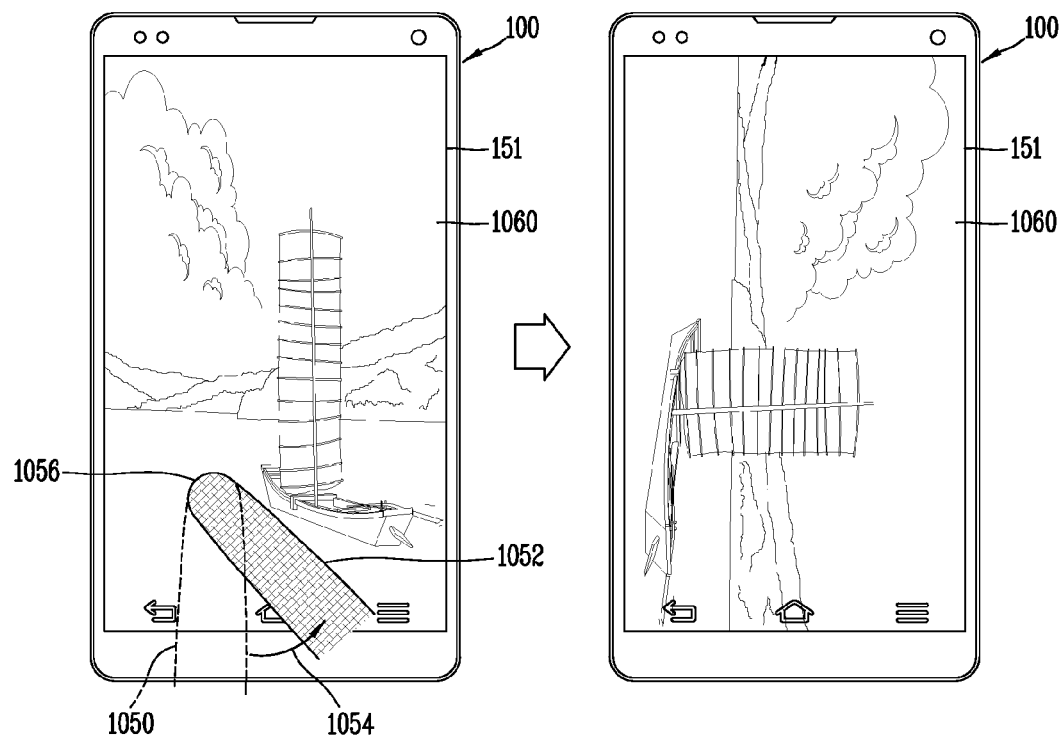

MOBILE TERMINAL AND METHOD OF CONTROLLING THE SAME BASED ON TYPE OF TOUCH OBJECT USED TO APPLY TOUCH INPUT

CROSS-REFERENCE TO RELATED APPLICATION

Pursuant to 35 U.S.C. § 119(a), this application claims the benefit of earlier filing date and right of priority to Korean Application Nos. 10-2014-0030461, filed on Mar. 14, 2014, and 10-2014-0061718, filed on May 22, 2014, the contents of which are hereby incorporated by reference herein in their entirety.

BACKGROUND OF THE DISCLOSURE

1. Field of the Disclosure

The present invention relates to a mobile terminal and a method of controlling the mobile terminal.

2. Background of the Disclosure

As the improvement, the mobile terminal receives an input signal that is applied to a touch screen by a user, using a touch sensor that converts pressure exerted on a touch screen or a change in electrostatic capacitance occurring at a specific portion of the touch screen into an electrical input signal, and accordingly, performs various functions.

With these improvements, the user can control various functions of the mobile terminal in a more convenient, intuitive manner. Accordingly, various methods of enabling the user to conveniently control various functions of the mobile terminal through the touch screen are now actively under development.

SUMMARY OF THE DISCLOSURE

Therefore, an aspect of the detailed description is to provide a mobile terminal that enables a user to control various functions in a more convenient manner through a touch screen, and a method of controlling the mobile terminal.

Another aspect of the detailed description is to provide a mobile terminal that enables a user to control a desired function in a precise, convenient manner even in a situation of using a given touch object, and a method of controlling the mobile terminal.

To achieve these and other advantages and in accordance with the purpose of this specification, as embodied and broadly described herein, there is provided a mobile terminal including: a touch screen; a controller that identifies a type of touch object with which a touch input is applied to the touch screen, and provides a touch input method that differs according to a type of the identified touch object, in which the controller identifies the touch object based on at least one among strength of a signal that is detected on the touch screen when the touch input is applied and on a distributed state of regions on which the signal is detected.

In the mobile terminal, the touch objects may include a finger, a touch pen, and a gloved finger, and the controller may select at least one or more, among graphic objects that are displayed on the touch screen, based on the touch input method that differs according to the type of the identified touch object.

In the mobile terminal, in a case where the touch input is applied with the gloved finger, based on duration of the touch input, the controller may select the graphic objects that are displayed in the vicinity of a point in the touch screen to which the touch input is applied, in response to the touch input.

In the mobile terminal, in the case where the touch input is applied with the gloved finger, the controller may select the other graphic objects positioned in the same column or row as the graphic object that is displayed on a position corresponding to the point on the touch screen to which the touch screen is applied, in response to the touch input.

In the mobile terminal, in a case where the touch input is applied with the gloved finger, based on the duration of the touch input, the controller may select the graphic objects that are displayed in the vicinity of a centerline of a region of the touch screen on which the touch screen is detected, in response to the touch input.

In the mobile terminal, in a case where the touch input is applied with the gloved finger, when it is detected that the touch object is moved, the controller may select the graphic objects that are displayed on a region of the touch screen that the touch object contacts while in motion, in response to the movement of the touch object.

In the mobile terminal, in a case where the touch input is applied, with the touch object, to a region of the touch screen, of which an area is a predetermined value or above, the controller may select the graphic objects in response to the movement of the touch object, regardless of the type of the touch object.

In the mobile terminal, in a case where the number of the types of the touch objects with which the touch input is applied is 2 or greater, the control performs control in such a manner that the touch input that is applied with the touch object performs a function that differs according to each of the types of the touch objects.

In the mobile terminal, based on an operation state of the mobile terminal, the controller may determine the different functions that are performed by the touch inputs applied with the touch objects.

In the mobile terminal, the controller may provide a user interface that differs according to the type of the identified touch object, and the user interface may differ in at least one, among a method of selecting at least one or more among the graphic objects that are displayed on the touch screen, a method of displaying the graphic objects, a method of inputting characters, and a function corresponding to the touch input.

In the mobile terminal, the controller may additionally determine a surrounding environment of the mobile terminal and may provide the user interface corresponding to the determined surrounding environment and a result of identifying the type of the touch object.

In the mobile terminal, when the signal corresponding to the touch input is detected on the touch screen, based on the strength of the detected signal and on an area of the region on which the signal is detected, the controller may determine whether the signal is due to a noise.

In the mobile terminal, when the signal corresponding to the touch input is detected on the touch screen, based on the strength of the detected signal, the controller may identify whether or not the touch object is the gloved finger.

In the mobile terminal, in a case where, as a result of the identification, the touch object is not the gloved finger, based on the distributed state of the regions on which the signal is detected, the controller may identify the touch object as the finger or the touch pen.

In the mobile terminal, in a case where, as the result of the identification, the touch object is the gloved finger, based on the strength of the detected signal, the controller may additionally identify a type of glove, and may cause a condition for the detection of the touch input to differ according to the type of the identified glove.

In the mobile terminal, in a case where a touch gesture is applied that rotates about a point to which the touch input is applied, based on the type of the identified touch object, the controller may change a direction in which a screen is output to the touch screen, either by an angle by which the touch gesture rotates, or by a predetermined angle.

To achieve these and other advantages and in accordance with the purpose of this specification, as embodied and broadly described herein, there is provided a method of controlling a mobile terminal, the method including: identifying a type of touch object with which a touch input is applied to a touch screen that is formed on the mobile terminal; determining a touch input method that differs according to the type of the identified touch object; and performing a function corresponding to the touch input by a user, which differs according to the determined touch input method, in which the touch input method is a means for inputting a signal that corresponds to the touch input by the user or a function corresponding to a touch gesture, or a function that corresponds to a touch gesture corresponding to a specific function or that corresponds to the same touch gesture.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
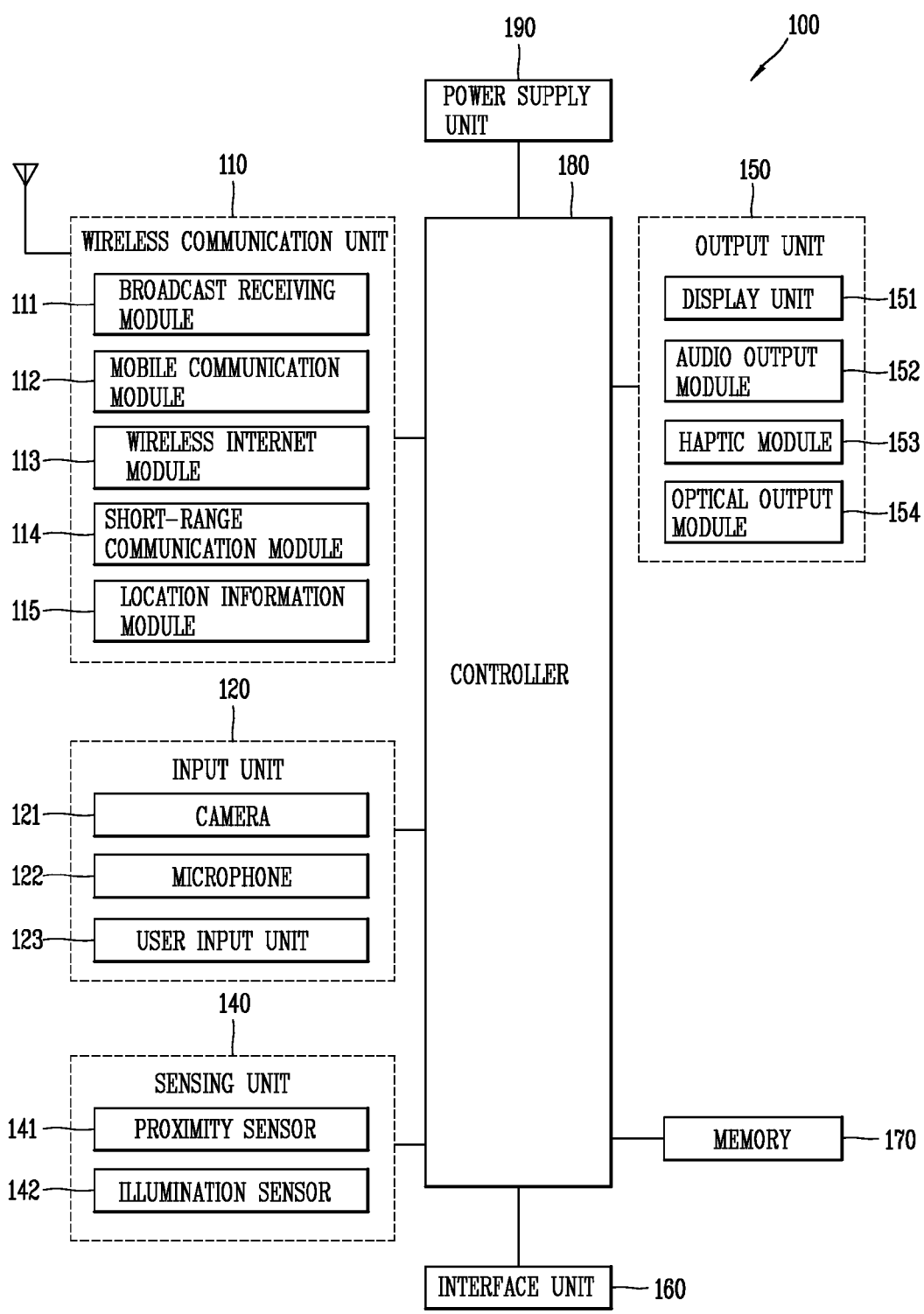
FIG. 1A is a block diagram for describing a mobile terminal according to the present invention.
Figure 1B:
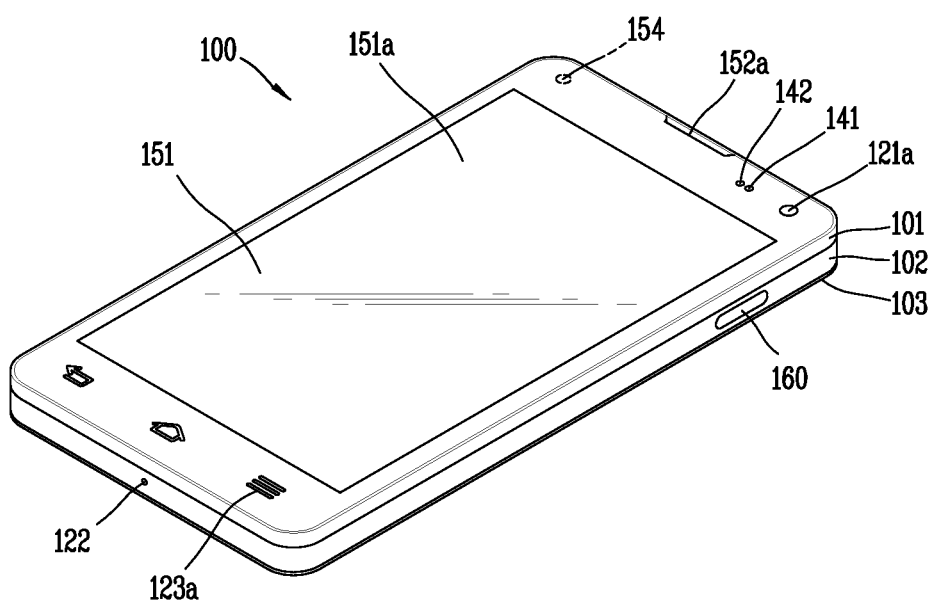
FIGS. 1B and 1C are diagrams illustrating the mobile terminal according to one embodiment of the present invention when viewed from different directions.
Figure 1C:
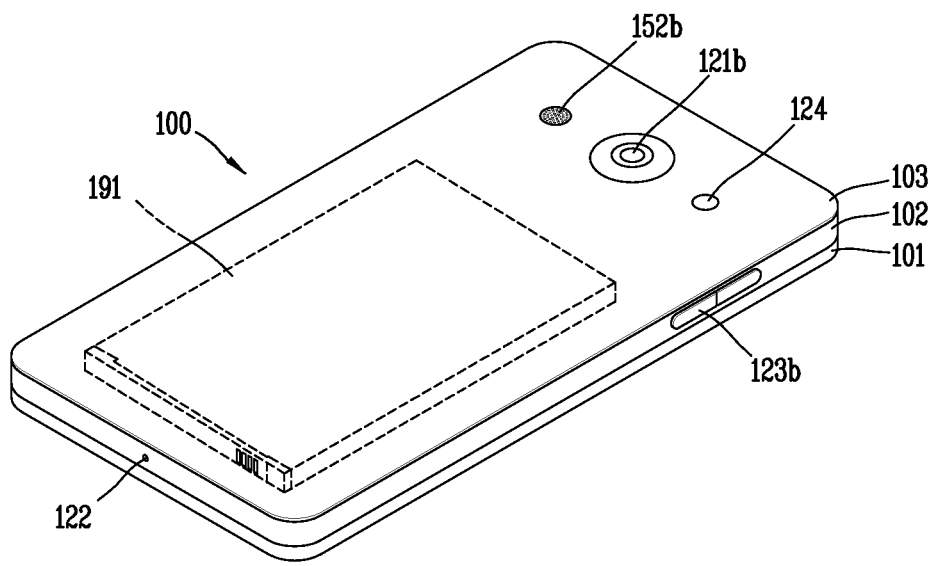

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151 a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

Some of these displays may be configured as transparent or light-transmissive displays through which the user may see the outside. These displays may be called as transparent displays. A representative example of the transparent displays may be a transparent OLED (TOLED), and the like. The rear structure of the display unit 151 may also be configured as a light-transmissive structure. Through such a structure, the user can see an object positioned on the rear of the body of the terminal through a region occupied by the display unit 151.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Control methods according to embodiments of the present invention, which can be realized in the mobile terminal configured as described above, are described below referring to the accompanying drawings. It is apparent to those skilled in the art that modification, alteration, and improvement can be made to the present invention within a scope that does not depart from the nature and gist of the present invention.

On the other hand, in a case where a touch input is applied to a display unit 151, a controller 180 according to the embodiment of the present invention identifies a type of touch object with which the touch input is applied. For example, the touch objects include a finger, a glove, a touch pen and the like. That is, the controller 180 identifies whether the user applies the touch input with his/her gloved finger, with his/her ungloved finger, or with the touch pen.

Here, the controller 180 uses a touch input signal that is generated when the touch input is applied to the display unit 151, in order to identify the touch object with which the touch input is applied. For example, the touch input signals include pressure that the touch object exerts on the display unit 151, a change in capacitance that is generated due to the touch by the touch object, and the like. Then, the controller 180 identifies each of the touch objects according to a difference between the touch input signals, each of which differs according to characteristics of the touch objects.

On the other hand, the controller 180 sets a touch input method that differs according to a result of the identification of the touch object. The touch input method here may mean a means for inputting a signal corresponding to the touch input, or may mean a predetermined touch gesture corresponding to a specific function.

That is, the controller 180 controls different means (for example, a keypad corresponding to each of the types of the touch objects) of inputting a signal that the user wants according to the type of the identified touch object. Alternatively, even though the same touch gesture is applied, the controller 180 performs a function that differs according to the type of the identified touch object. Alternatively, the controller 180 may cause the touch gesture, which differs according to the identified touch object, to correspond to the same function. Additionally, in a case where the touch inputs are applied with the multiple different touch objects, the controller 180 may perform a function that differs according to the type of the touch object.

Accordingly, pieces of information relating to an identification reference against which each of the multiple touch objects is identified are stored in a memory 170. Pieces of information corresponding to the touch input methods corresponding to the multiple touch objects, respectively, are stored in the memory 170.

Figure 2:
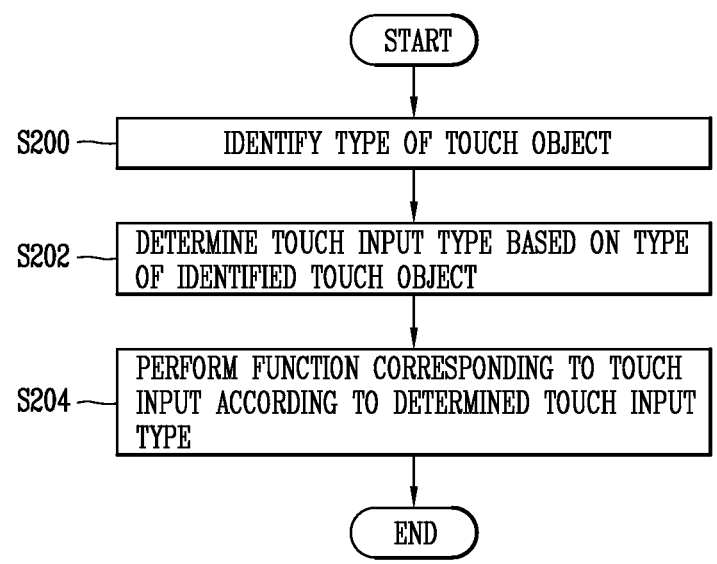
FIG. 2 is a flowchart illustrating a process in which the mobile terminal according to the embodiment of the present invention operates.

FIG. 2 illustrates processes in which a mobile terminal according to the embodiment of the present invention operates.

Referring to FIG. 2, in a case where the touch input signal is detected from the display unit 151, the controller 180 of a mobile terminal 100 according to the embodiment of the present invention identifies the touch object with which the touch input is applied (S200).

In Step S200, the controller 180 identifies the touch object in various methods. For example, the controller 180 identifies the touch object based on strength of the touch input signal. Alternatively, the controller may identify the touch object based on a distributed state of regions in which the touch input signal is detected, that is, an area of the region on which the touch input signal is detected, or contact points on the region of the display unit 151 at which the touch input signal is.

Here, of course, in order to identify the touch object, the controller 180 may use all of the strength of the touch input signal and the distributed state of the regions on which the touch input signal is detected. A method of identifying the touch object in Step S200 is described in more detail below referring to FIGS. 3A to 3C and 4.

On the other hand, if the touch object is identified in Step S200, the controller 180 determines the touch input method corresponding to the type of the identified touch object (S202). In Step S202, the controller 180 determines the touch input method that differs according to the result of the identification of the touch object. Here, the touch input method may mean a mean for inputting the signal corresponding to the touch input as described above or many mean a predetermined touch gesture for performing a specific function.

Therefore, the different touch input methods mean different means for inputting the signal corresponding to the touch input by the user. Alternatively, the different touch input methods may mean different gestures corresponding to a specific function or may mean different functions corresponding to the same touch gesture.

Then, the controller 180 performs a function corresponding to the touch input according to the determined touch input (S204). Therefore, in Step S204, an input signal is received through an input method editor (IME) that differs according to the type of the identified touch object. In addition, in Step S204, different functions may be performed with the same touch input, or the same function may be performed with the different touch inputs.

That is, in Step S204, the controller 180 receives a key input signal through different virtual keyboards in a case where the touch input is applied with the gloved finger and in a case where the touch input is applied with the ungloved finger. Alternatively, in a case where the user wears a glove and in a case where the user does not wear the glove, in Step S204, the controller 180 may select graphic objects (for example, icons) being displayed on the display unit 151, based on the different touch input gestures.

Figure 3A:
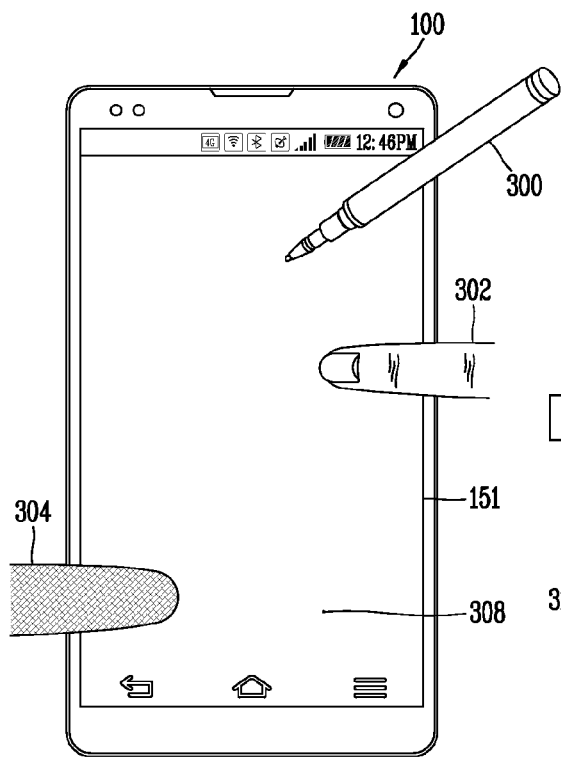
FIGS. 3A to 3C are diagrams illustrating examples of each strength of touch input signals corresponding to various touch objects and a region on which the touch input signal is detected.
Figure 3B:
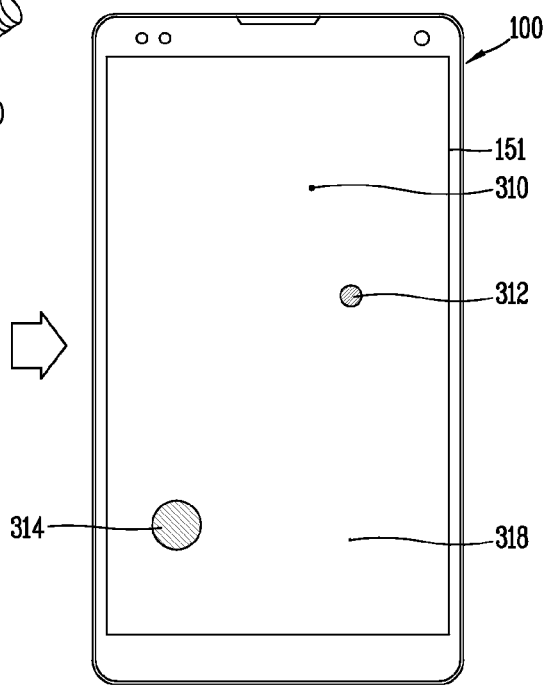
Figure 3C:
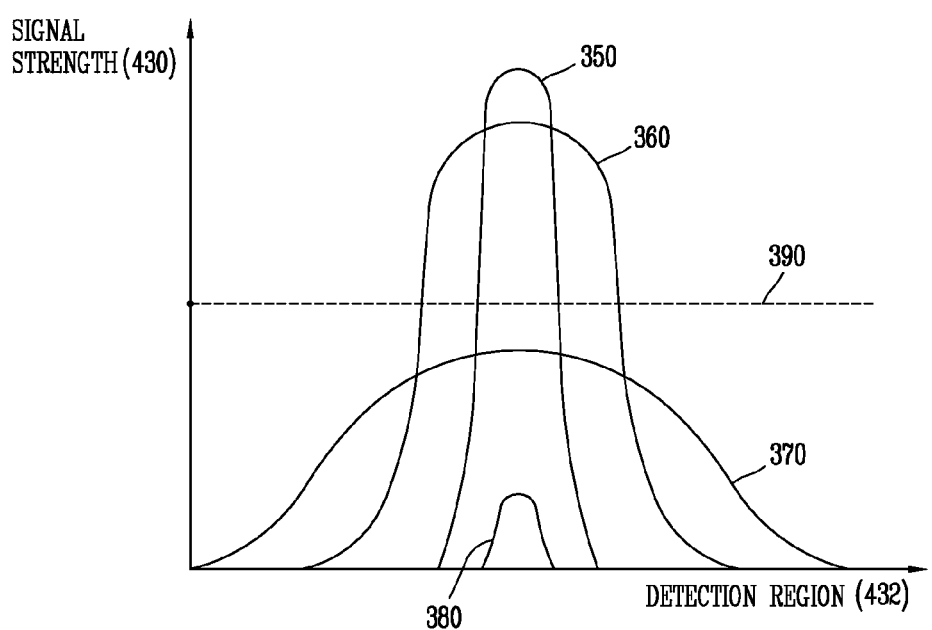
Figure 4:
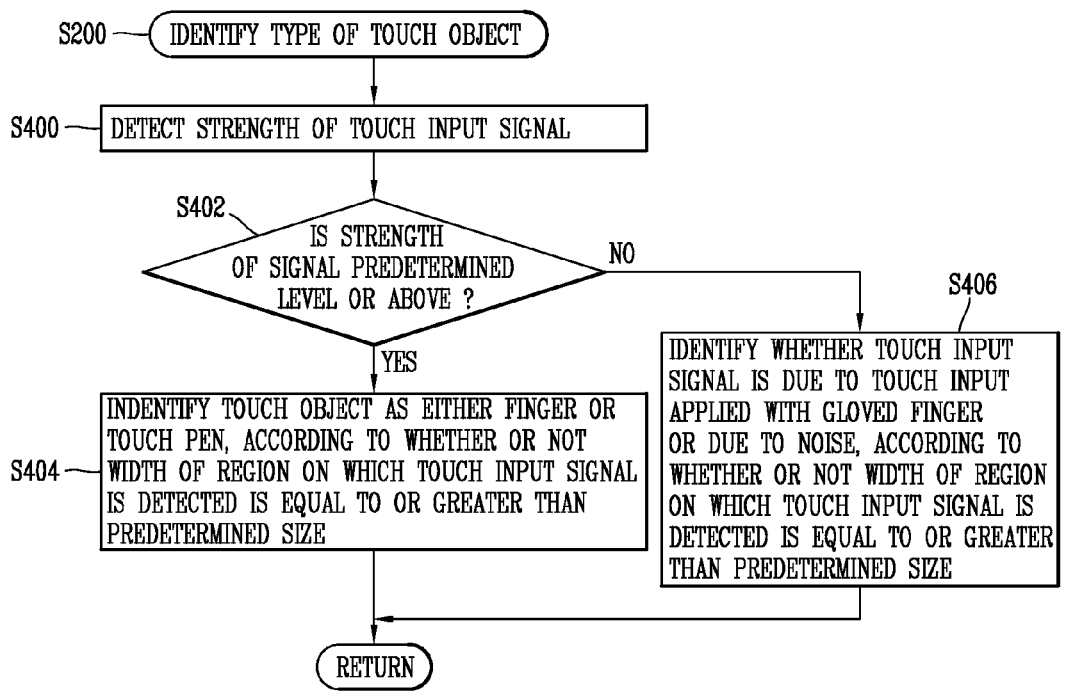
FIG. 4 is a flowchart illustrating in more detail an operating process in which the type of the touch object is identified, in the process illustrated in FIG. 2.

On the other hand, FIGS. 3A and 3C are diagrams illustrating examples of each strength of the touch input signals corresponding to the various touch objects and the region on which the touch input signal is detected. FIG. 4 illustrates in detail an operating process in which the type of the touch object is identified, in the process illustrated in FIG. 2. Referring to FIGS. 3A to 3C and 4, as an example, the touch input is described below as being applied with the touch object such as the finger, the touch pen, or the gloved finger. However, the present invention is not limited to this. Of course, the present invention also may apply to the touch objects that are not described referring to FIGS. 3A to 3C and 4.

FIGS. 3A, 3B and 3C illustrate an example in which in a case where the touch inputs are applied with the various touch objects, the touch inputs are detected on the regions of the display unit 151 and the touch input signals are detected.

First, FIG. 3A illustrates an example in which the touch inputs are applied with various touch objects 300, 302, and 304.

FIG. 3B illustrates an example in which touch input signal detection regions 310, 312, and 314 correspond to the touch objects 300, 302, and 304, respectively.

As illustrated in FIGS. 3A and 3B, a region 312 of the display unit 151 on which the touch input is detected in a case where the touch input is applied with a finger 302 is wider than a region 310 on which the touch input is detected in a case where the touch input is applied with a touch pen 400. Then, as illustrated in FIG. 3B, a region 314 on which the touch input is detected in a case where the touch input is applied with a gloved finger 304 is the widest of the regions of the display unit 151. Therefore, of course, the touch object with which the touch input is applied may be identified based on the area of the region on which the touch input is detected. However, the area of the region on which the touch input is detected varies depending on which finger of the user is used to apply the touch input or on how the user applies the touch input. Thus, according to the present invention, the detected strength of the touch input signal is additionally used in identifying the touch object.

FIG. 4 illustrates the operating process in which the type of the touch object is identified, considering in this manner all the strength of the touch input signal and the region on which the touch input signal is detected.

Referring to FIG. 4, in a case where the touch input signal is detected on the display unit 151, the controller 180 detects the strength of the touch input signal (S400). Here, as described above, the touch input signal is a change in capacitance or the like. Therefore, in Step S400, the strength of pressure that is detected at a specific point on the display unit 151 or an amount of the change in capacitance is measured.

When in Step S400, the strength of the touch input signal is detected, the controller 180 determines whether the detected strength of the touch input signal is a predetermined level or above (S402). Then, based on the result of the detection in Step S402, the controller 180 identifies the touch object with which the touch input is applied, as the finger of the user or the touch pen, or the gloved finger of the user.

For example, as illustrated in FIG. 3C, the strength of the touch input signal in a case 350 in which the touch input is applied with a touch pen 300 and in a case 360 in which the touch input is applied with the finger 302 is a predetermined level 390 or above. Then, the strength of the touch input signal in a case 370 where the touch input is applied with a gloved finger 304 is weaker than that in the case 360 in which the touch input is applied with the finger 302 and in the case 350 in which the touch input is applied with the pen 300. This is because the gloved finger 304 creates a space present between the gloved finger and the display unit 151. Thus, the change in capacitance due to the touch input is small or the pressure is distributed due to the gloved finger, thereby decreasing strength of the pressure exerted due to the touch input.

Therefore, in a case where as a result of the determination in Step S402, the detected strength of the touch input signal is a predetermined level or above, the controller 180 identifies the touch object as the finger or the touch pen. In a case where the detected strength of the touch input signal is below the predetermined level, the controller 180 identifies the touch object as the gloved finger.

In this case, in order to identify the touch object in a more precise manner, the controller 180 additionally takes into consideration the distributed state of the regions of the display unit 151 on which the touch input is detected. That is, in a case where as the result of the determination in Step S402, the strength of the touch input signal is the predetermined level or above, the controller 180 identifies whether or the touch object is the finger or the touch pen, depending on whether or not an area of the region on which the touch input signal is detected is a predetermined value (S404).

In Step S404, in a case where the area of the region on which the touch input signal is the predetermined value or above, the controller 180 identifies the touch object as the finger. In contrast, in Step S404, in a case where the area of the region on which the touch input signal is detected is smaller than the predetermined value, the controller 180 identifies the touch object as the touch pen. This is because as illustrated in FIGS. 3B and 3C, the area of the region of the display unit 151 on which the touch input is detected in the case where the touch input is applied with the finger 302 is greater than that in the case where the touch input is applied with the touch pen 400.

On the other hand, of course, the touch input signal may be generated due to noise that occurs on the display 151. Then, generally, a signal generated due to the noise is different from the signal generated in the case where the touch input is applied with the touch pen, the finger, or the gloved finger, in terms of the strength of the signal and the distributed state (for example, the area) of the region on which the signal is detected.

For example, in a case where a signal due to the noise, as illustrated in FIG. 3A, is detected at one point 308 on the display unit 151, as illustrated in FIGS. 3B and 3C, a region on which the signal is detected is small in size and the detected strength of the signal is weak. Accordingly, based on the area of the region on which the signal is detected and the strength of the signal, the controller 180 detects and filters out the signal generated due to the noise.

For example, in a case where the touch input signal is detected on the display unit 151, the controller 180 first determines whether or not the signal is generated due to the noise, based on the area of the region on which the signal is detected and the strength of the signal, and then filters out the signal due to the noise.

In the case where the touch input signal is detected on the display unit 151, the controller 180 determines whether or not the strength of the signal that is detected in Step S402 is a predetermined level or above. In a case where the detected strength of the signal is below the predetermined level, the controller 180 determines the detected touch input signal as a signal generated due to any one among the touch input applied with the gloved finger and the noise. Then, the controller 180 additionally checks the distributed state (for example, the area) of the region on which the signal is detected, and thus identifies whether the touch input signal is generated due to the gloved finger or due to the noise (S406).

On the other hand, in a case where it is determined in Step S406 that the touch input signal is due to the touch input applied with the gloved finger, the controller 180, of course, can additionally identify a type of glove.

Here, the type of the glove is determined using a method that differs according to a thickness of the glove. For example, the thicker a material of the glove, the greater the area of the region of the display unit 151 on which the touch is detected and the weaker the touch input signal generated due to the touch input. This is because the thicker the material of the glove, the easier the pressure exerted on the display unit 151 by the user is distributed and the smaller the amount of the change in capacitance at the point to which the touch input is applied.

That is, the signal that is generated by the touch input in a case where the touch input is applied with the gloved finger with a thin cotton-made glove being worn on the user's hand is different from that in a case where the touch is applied with gloved finger with a thick leather-made glove being worn on the user's hand, in terms of the strength of the signal and the distributed state of the regions on which the signal is detected. Therefore, in a case where the touch object is identified as the gloved finger, of course, the controller 180 can additionally identify also the type of the glove that the use wears on his/her hand, based on the strength of the touch input signal and on the distributed state of the regions on which the touch input signal is detected.

Accordingly, the controller 180 may provide the touch input method that differs according to the identified type of the glove. For example, in the case where the user wears the thin cotton-made glove on his/her hand, the controller 180 may provide the touch input method that corresponds to a case where the touch input is applied with the ungloved finger, not with the gloved finger. This is because in a case where the use wears the thin glove on his/her hand, it is more convenient for the user to apply the touch input in the same manner as when the touch input is applied with the finger. However, in this case, in terms of recognizing the touch input, the controller 180 sets a condition for detecting the touch input, in the case where the touch input is applied with the finger, differently than in the case where the touch input is applied with the gloved finger with the thin glove being worn on the user's hand.

For example, the controller 180 sets touch input duration for determining the touch input as remaining applied, in the case where the touch input is applied with the finger, differently than in the case where the touch input is applied with the glove finger with the thin glove being worn on the user's hand. In addition, similarly, the controller 180 sets the touch input duration for determining whether the touch input remains applied, in a case where the touch input is applied with the gloved finger with a thick glove being worn on the user's hand, differently than in the case where the touch input is applied with the gloved finger with the thin glove being worn on the user's hand.

Alternatively, in the case where the touch input is applied with the gloved finger, the controller 180 may change a function that is performed with the touch gesture by the user or may change a result of performing the function, according to the identified type of the glove.

For example, in the case where the touch input is applied with the gloved finger with the glove being worn on the user's hand, the controller 180 selects the graphic object, which is displayed on the display unit 151, based on duration of the touch input. Here, even though the touch input continues to be applied for the same time, the controller 180 may select the number of the graphic objects that differs according to the identified type of the glove. This is because the controller 180 changes the number of the graphic objects that is determined based on the duration of the touch input, according to the identified type of the glove.

On the other hand, the area of the region on which the signal is detected is described above as being checked based on the distributed state of the regions on which the signal is detected, but the present invention is not limited to this. For example, in a case where the display unit 151 are partitioned into multiple detection regions, based on the number of the regions on which the touch input signal is detected and on a position of the region on which the touch input signal is detected, the controller 180 may determine whether the touch input signal is generated by the touch input applied with the finger or the touch pen, is generated by the touch input applied with the gloved finger, or is generated by the noise.

As one example, in a case where among the multiple detection regions, the regions of which the number is greater than a given number, and on which the signal is detected are adjacent to one another (that is, are distributed in a concentrated manner on a specific region of the display unit 151), the controller 180 identifies the signal as being generated by the touch input applied with the finger, the touch pen, or the gloved finger. However, in a case where the regions on which the signal is detected are separated a predetermined distance or above from one another (that is, are dispersed at many points on the display unit 151), the controller 180 may determine that the signal is generated due to the noise.

In addition, as an example, the strength of the touch input is described above as being first determined, but in reverse order, the distributed state of the regions on which the signal is detected, of course, may be first determined. In this case, based on whether the detected strength of the touch input signal is a predetermined level or above, the controller 180 determines whether the touch input signal is generated by the touch input applied with either of the gloved finger and the finger, is generated by the touch input applied with the touch pen, or is generated by the noise. This is because the area of the region on which the touch input is detected is greater in the case of the gloved finger or in the case of the finger than in the case of the touch pen.

In this case, the controller 180 identifies the touch object in each case, based on the strength of the touch input signal in each case. That is, in the case where it is determined that the touch input signal is generated by the touch input applied with the gloved finger or the finger, the controller 180 identifies the touch object as the finger when the strength of the signal is a predetermined level or above, and identifies the touch object as the gloved finger when the strength of the signal is below the predetermined level. In addition, in a case where it is determined that the touch input signal is generated by the touch input applied with the touch pen or by the noise, the controller 180 identifies the touch input as being applied with the touch pen when the detected strength of the signal is the predetermined level or above.

On the other hand, as described above, the touch input signal is pressure exerted on the display unit 151 or a change in capacitance that is detected at a specific point on the display unit 151. Accordingly, the strength of the touch input signal is an amount of pressure or the extent of the change in capacitance. The distribution of the region on which the touch input signal is detected is the distribution of the region on which an amount of the change in capacitance that is a predetermined level or above is detected.

On the other hand, based on the touch object that is primarily identified according to the strength of the signal or on the distributed state of the regions on which the signal is detected, the controller 180 may apply different identification references when the touch object is secondarily identified. That is, based on whether or not, among the strength of the touch input signal, that is, the amount of the pressure exerted on a specific point on the display unit 151, and the amount of the change in capacitance, at least one is a predetermined level or above, the controller 180 primarily identifies whether the touch object is either of the finger and the touch pen, or the gloved finger.

Then, in a secondary process in which it is identified whether the touch object is either of the finger or the touch pen, the controller 180 may identify whether the touch object is the finger or the touch pen, based on the area of the region on which a predetermined amount of the change in capacitance or above occurs, instead of the area of the region on which an predetermined amount of pressure or above is exerted. This is because in the case of the touch input applied with the finger, the change in capacitance is greater than the change in the pressure and in the case of the touch input applied with the touch pen, the change in the pressure is greater than the change in the capacitance.

In addition, in a case where primary identification is performed based on the area of the region on which the signal is detected, the controller 180 primarily identifies whether the touch object is either of the gloved finger and the finger, or the touch pen, based on the distributed state of the regions on which the signal is detected, that is, based on at least one, among a predetermined amount of the pressure or above and a predetermined amount of the change in capacitance or above on the display unit 151.

Then, in a case where it is identified whether the touch object is either of the gloved finger or the finger (a secondary identification process), the controller 180 identifies the touch object, based on the detected amount of the change in capacitance. This is because in the case of the touch input applied with the finger and in the case of the touch input applied with the gloved finger, a difference between the amounts of the change in capacitance is more definite than a difference between the amounts of the pressure. In addition, alternatively, in identifying whether the signal is generated by the touch input applied with the touch pen or is generated by the noise, the controller 180 may use as the identification reference the detected difference in the amounts of the pressure rather than the difference between the amounts of the change in capacitance. This is because in the case of the touch input applied with the touch input, the difference between the amounts of the pressure is more definite than the difference between the amounts of the change in capacitance.

On the other hand, when the touch input method that corresponds to the touch object that is identified in Step S202 is determined, the controller 180 performs a specific function corresponding to the touch gesture by the user according to the determined touch input method. Then, as described above, the different touch input methods may mean different means for inputting the signal corresponding to the touch input, and may mean different touch gestures that correspond to a specific function.

Here, there are various specific functions. For example, the specific function is a function or an application that differs according to the type of the identified touch object in a case where the touch input is detected. Alternatively, the specific function is a function of selecting icons or various thumbnail images that are displayed on the display unit 151, a function of selecting multiple graphic objects, such as items including files, that are displayed on the display unit 151, or the like.

For example, while the user continues to apply the touch input for a predetermined time or more, that is, in a case where the touch input remains applied for the predetermined or more, the controller 180 performs a management function of deleting a specific graphic object, changing a name of the specific graphic object, and the like. Alternately, in a case where the touch input continues to be applied for the predetermined time or more, the controller 180 performs the function of selecting the multiple graphic objects that are displayed on the display unit 151. Then, in this manner, the controller 180 determines the function that differs according to the type of the identified touch object.

Figure 5:
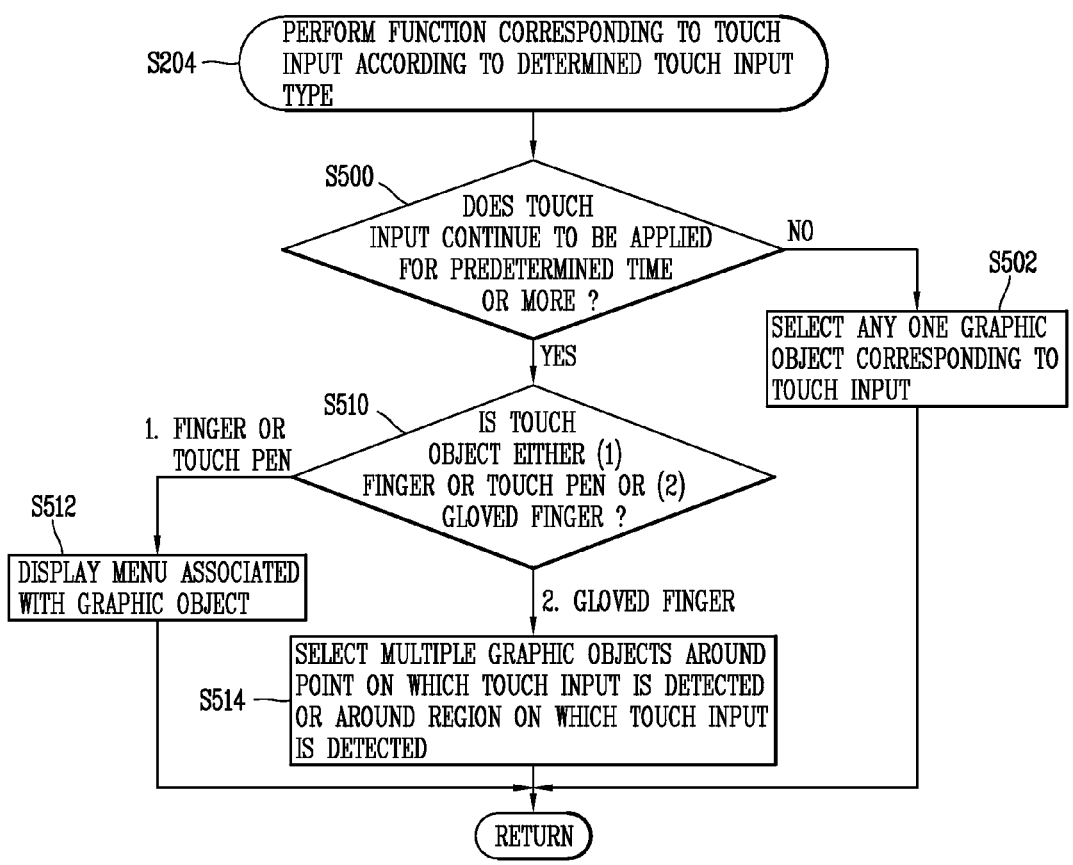
FIG. 5 is a diagram illustrating one example of an operating process in which a function is provided that differs according to the type of the touch object, in the process in illustrated in FIG. 2.

FIG. 5 illustrates an example of an operating process in which a function is performed that differs according to the type of the touch object in a case where, in such a case, the touch continues to be applied for a predetermined time or more in the mobile terminal according to the embodiment of the present invention.

Referring to FIG. 5, the controller 180 determines whether or not the touch input by the user continues to be applied for a predetermined time or above (S500). Then, in a case where as a result of the determination, the touch input continues to be applied for less than the predetermined time, the controller 180 determines that the touch input is for selection of any one graphic object, not for selection of the multiple graphic objects. Accordingly, in a case where as the result in Step S500, the touch input continues to be applied for less than the predetermined time, the controller 180 selects any one graphic object corresponding to the touch input (S502).

However, in a case where, as the result in Step S500, the touch input continues to be applied for the predetermined time or more, the controller 180 performs a different function, based on the type of the touch object that is identified in Step S200.

For example, in the case where, as the result in Step S500, the touch input continues to applied for the predetermined time or more, the controller 180 determines a function corresponding to the touch input that remains applied, according to whether the identified touch object is either of the finger or the touch pen, or the gloved finger (S510).

In Step S510, in a case where the identified touch object is either of the finger or the touch pen, the controller 180 determines that the touch input which continues to be applied for the predetermined time or more is for performing a function of managing a specific graphic object. In this case, in response to the touch input that continues to be applied for the predetermined time or more, the controller 180 displays a menu for the management function in the vicinity of the graphic object corresponding to a point on the display unit 151 at which the touch input is applied (S512).

However, in Step S510, in a case where the identified touch object is the gloved finger, the controller 180 determines that the touch input which continues to be applied for the predetermined time or more is for performing a function of selecting the multiple graphic objects. In this case, in response to the touch input that continues to be applied for the predetermined time or more, the controller 180 selects the multiple graphic objects that are displayed around a point on the display unit 151 at which the touch input is detected, or around a region of the display unit 151 on which the touch input is detected (S514).

In Step S514, the controller 180 selects the multiple graphic objects using a method that varies with the touch gesture by the user. For example, based on the duration of the touch input, the controller 180 selects the multiple graphic objects based on a specific point on the display unit 151 at which the touch input is detected. In addition, in a case where the area of the region of the display unit 151 on which the touch input is detected is a predetermined value or above, the controller 180 may select the multiple graphic objects in the vicinity of the region on which the touch input is detected, based on the duration of the touch input. An example in which in the case where the touch object is the gloved finger, the multiple graphic objects are selected in this manner by the touch input is described in more detail below referring to FIGS. 7(*a*) to 7(*d*) and 8(*a*) to 8(*c*).

On the other hand, the different touch input methods, of course, may mean different touch gestures corresponding to the same function. That is, in a case where the touch gesture that differs according to the type of the identified touch object is detected, the controller 180 of the mobile terminal 100 according to the embodiment of the present invention may perform the same function in different methods. For example, the same function refers to a function of selecting the multiple graphic objects that are displayed on the display unit 151. Accordingly, the controller 180 of the mobile terminal 100 according to the embodiment of the present invention selects the graphic objects on the display unit 151 using a method that differs according to the type of the identified touch object.

Figure 6:
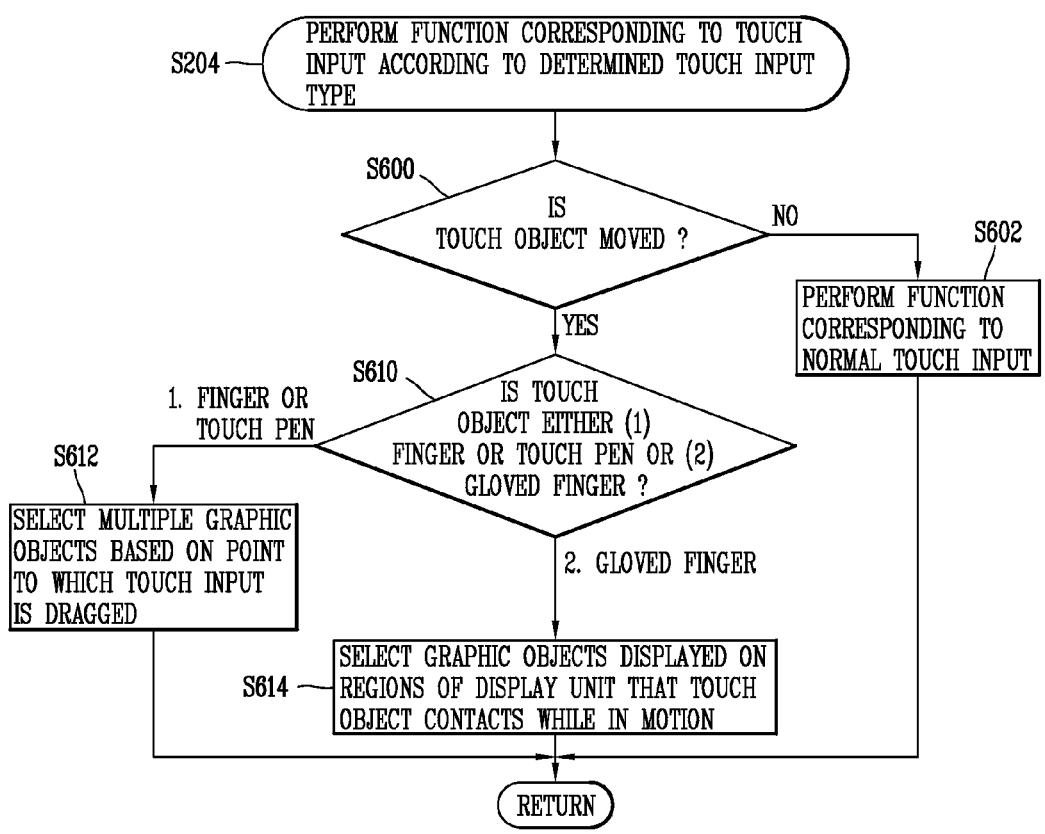
FIG. 6 is a diagram illustrating another example of the operating process in which a function is provided that differs according to the type of the touch object, in the process in illustrated in FIG. 2.
Figure 7A:
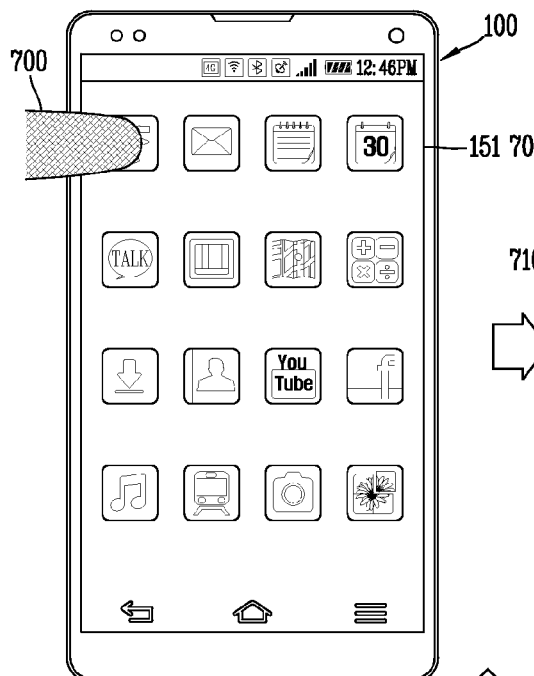
FIGS. 7(a) to 7(d), 8(a) to 8(c), and 9(a) to 9(d) are diagram illustrating examples in which multiple graphic objects are selected when the touch input is applied with a gloved finger in the mobile terminal according to the embodiment of the present invention.
Figure 7B:
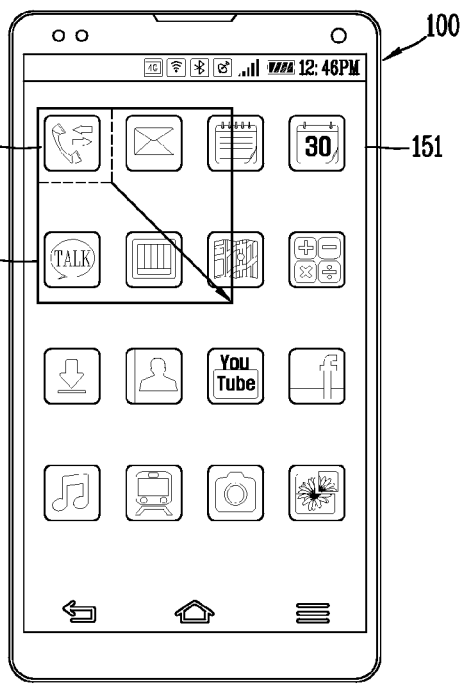
Figure 7D:
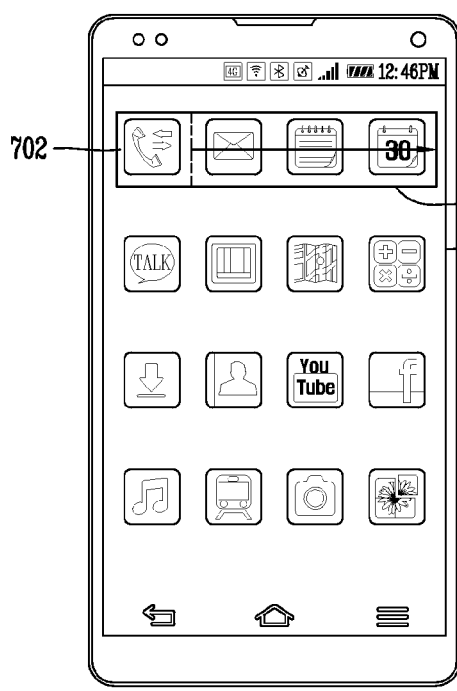
Figure 7C:
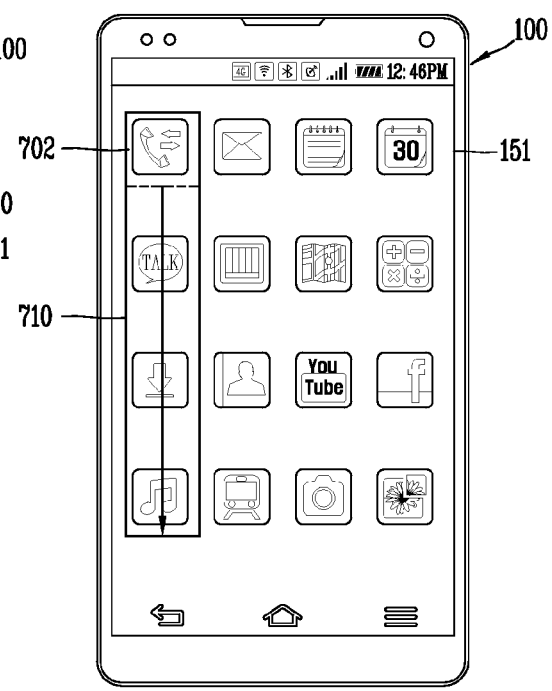

FIG. 6 illustrates an example in which in such a case, the mobile terminal according to the embodiment of the present invention operates.

For example, in a case where the touch object with which the touch input is applied is moved, the controller 180 selects the multiple graphic objects based on the movement of the touch object. In this case, when the touch input is detected on the display unit 151, the controller 180 identifies the touch object in Step S200. Then, the controller 180 detects whether or not the identified touch object is moved (S600).

In a case where, as a result, in Step S600, the touch object with which the touch input is applied is not moved, the controller 180 determines that the touch input is not for the selection of the multiple graphic objects. Therefore, in this case, the controller 180 performs a normal function, that is, a function of selecting a specific graphic object in response to the touch input, or displays a menu screen for managing the graphic object on the display unit 151 (S602). Here, the controller 180, of course, may perform a function of selecting a specific graphic object or displaying the menu screen according the type of the identified touch object.

On the other hand, in a case where as the result in Step S600, the touch object with which the touch input is applied is moved, the controller 180 selects the graphic objects using a method that differs according to the type of the touch object that is identified in Step 200 (S610).

Then, when in Step S610, the identified touch object is either of the finger and touch pen, the controller 180 selects the multiple graphic objects, based on a point to which the finger or the touch pen with which the touch input is applied is moved, that is, a point to which the touch input is dragged on the display unit 151 (S612). For example, in Step S612, the controller 180 forms a constant selection region (for example, a region in the form of a rectangle of which the diagonal line is a straight line connecting between the first point and the second point), based on a straight line connecting between a first point on the display unit 151 at which the touch input is first detected and a second point to which the touch input is dragged, and selects the multiple graphic objects that fall within the selection region.

However, in a case where in Step S612, the identified touch object is the gloved finger, the controller 180 provides the touch input method in which the multiple graphic objects are selected in a different way from that in Step S612. For example, in the case where in Step S612, the identified touch object is the gloved finger, when the gloved finger is moved, the controller 180 may select the graphic objects that are displayed on regions of the display unit 151 that the gloved finger contacts while in motion. Referring to FIGS. 9(*a*) to 9(*d*), an example is described in more detail in which in the case where the touch object is the gloved finger the multiple graphic objects are selected in this manner based on the movement of the gloved finger.

Accordingly, according to the present invention, for the identified touch object, different functions are performed based on the same touch gesture, or the same or similar function is performed in different methods based on the different touch gestures. Therefore, the user can use a specific function in a more convenient manner according to the type of the touch object that he/she uses when applying the touch input, or can input a desired function or signal in a more suitable manner according to the type of the touch object.

The method in which the mobile terminal according to the embodiment of the present invention identifies the touch object and the operating process in which the touch input method is provided that differs according to the type of the identified touch object are described above.

Referring to the drawings, an example is described in detail below in which in a case where the touch object is identified as the gloved finger in the mobile terminal according to the embodiment of the present invention, a specific function is performed in a different way from the way in which the touch input is applied with the finger or the touch pen.

FIGS. 7(*a*) to 7(*d*), 8(*a*) to 8(*c*), and 9(*a*) to 9(*d*) illustrate the examples in which the multiple graphic objects are selected when the touch input is applied with the gloved finger in the mobile terminal according to the embodiment of the present invention. Here, FIGS. 7(*a*) to 7(*d*) and 8(*a*) to 8(*c*) illustrate the examples in which the multiple graphic objects are selected based on the duration of the touch input when the touch input is applied with the gloved finger in the mobile terminal according to the embodiment of the present invention. FIGS. 9(*a*) to 9(*d*) illustrate the examples in which the multiple graphic objects are displayed in a case where the touch object with which the touch input is applied is moved.

First, referring to FIGS. 7(*a*) to 7(*d*), in a case where, as illustrated in FIG. 7(*a*), an input 700 is applied with the gloved finger with the glove being worn on the use's hand, the controller 180 identifies the touch object, with which the touch input is applied, as the gloved finger, based on the distributed state of the regions on which the touch input 700 is detected or on the strength of the signal that is generated by the touch input 700.

In this case, based on time at which the touch input is applied to the display unit 151, the controller 180 selects at least one or more, among the graphic objects that are displayed on the display unit 151, as the ones corresponding to the touch input. For example, the controller 180 selects the graphic objects, which are displayed around a region of the display unit 151 on which the touch input 700 is detected, as the ones corresponding to the touch input 700. Alternatively, the controller 180 selects the other graphic objects positioned in the same column or row as the graphic object displayed at a point on the display unit 151 at which the touch input 700 is detected, as the ones corresponding to the touch input 700. FIGS. 7(*b*) to 7(*d*) illustrate this example.

First, FIG. 7(*b*) illustrates an example in which the graphic objects are selected that are selected in the vicinity of the point on the display unit 151 at which the touch input 700 is detected. Referring to FIG. 7(*b*), the controller 180 forms a selection region 710 in the vicinity of a graphic object 702 that is displayed at the point on the display unit 151 that corresponds to the touch input 700, and the selection region 710 is extended based on the duration of the touch input 700. In this case, the longer the duration of the touch input 700, the greater the area of the selection region 710. Thus, based on the duration of the touch input 700, the graphic objects more than displayed on the display unit 151 are selected as the ones corresponding to the touch input 700.

On the other hand, the controller 180 may select the multiple graphic objects in a different way from that illustrated in FIG. 7(*b*). For example, the controller 180 extends the selection region 710, formed in the vicinity of the graphic object 702 corresponding to the touch input 700, in a transverse or longitudinal direction of the graphic object 702 based on the duration of the touch input 700. Accordingly, as the duration of the touch input 700 is longer, more graphic objects positioned in the same column or row as the graphic object 702 corresponding to the touch input 700 are selected as the ones corresponding to the touch input 700. FIGS. 7(*b*) and 7(*c*) illustrate this example.

Figure 8A:
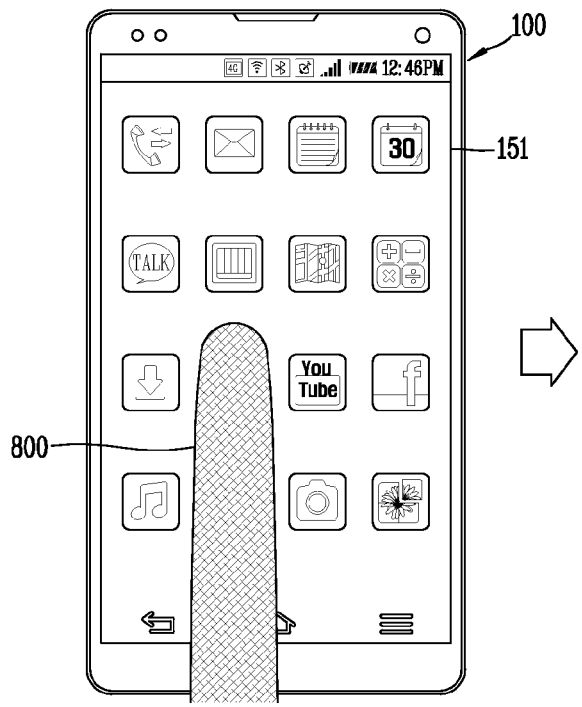
Figure 8B:
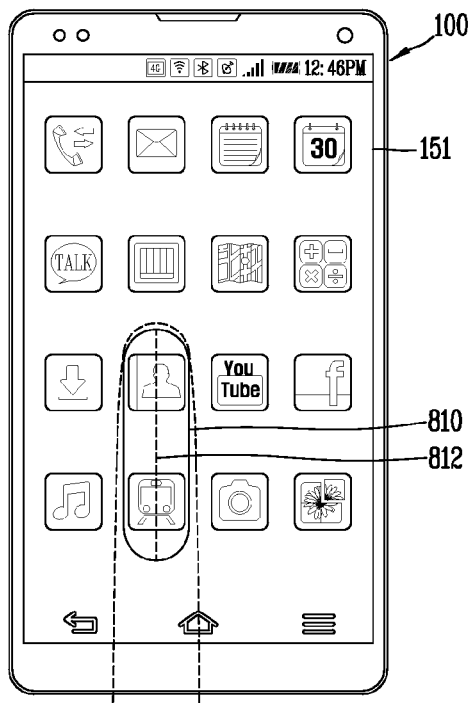
Figure 8C:
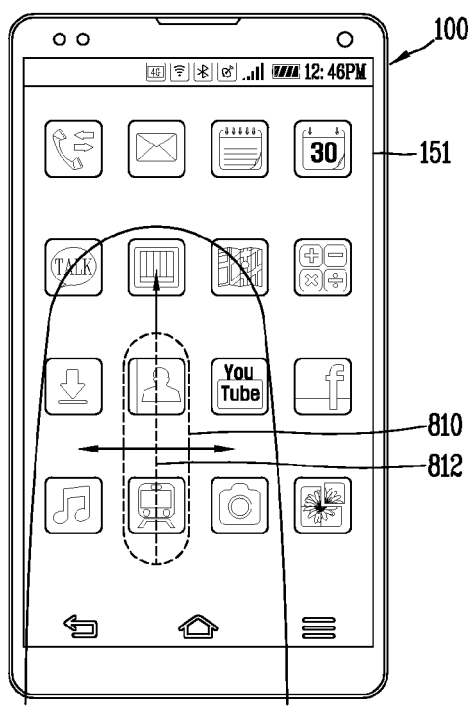

On the other hand, FIGS. 8(*a*) to 8(*c*) illustrates an example in which the multiple graphic objects are selected considering not only the duration of the touch input but also the region of the display unit 151 on which the touch input is detected.

First, in a case where, as illustrated in FIG. 8(*a*), a touch input 800 is applied with the gloved finger with the glove being worn on the user's hand, the controller 180, as illustrated in FIG. 8(*b*), detects a region 810 of the display unit 151 to which the touch input is applied.

Then, the controller 180 forms the selection region around the region 810 on which the touch input 800 is detected. Here, the area of the selection region is determined based on the duration of the touch input 800. The longer the duration of the touch input 800, the more the selection region is extended.

Here, the controller 180 determines a reference for forming the selection region from the region 810 on which the touch input 800 is detected. For example, the controller 180, as illustrated in FIG. 8(*b*), detects a centerline 812 of the region on which the touch input 800 is detected, and extends the selection region with the centerline 812 serving as the reference, based on the duration of the touch input 800. Then, the graphic objects included in the extended selection region are selected as the graphic objects corresponding to the touch input 800. FIG. 8(*c*) illustrates an example in which, in this manner, the selection region 810 is extended with the detected centerline 812 serving as the reference based on the duration of the touch input 800 and accordingly, the more graphic objects are selected.

On the other hand, FIGS. 9(*a*) to 9(*d*) illustrates an example in which in the mobile according to the embodiment of the present invention, the touch input applied with the gloved finger is detected and in a case where the region on which the touch input is detected is moved, the multiple graphic objects are selected.

First, FIGS. 9(*a*) and 9(*b*) illustrates an example in which in a case where the touch input is applied with the gloved finger with the glove being worn on the user's hand, the touch input applied with a touch object 900 is detected on a region 910.

Figure 9A:
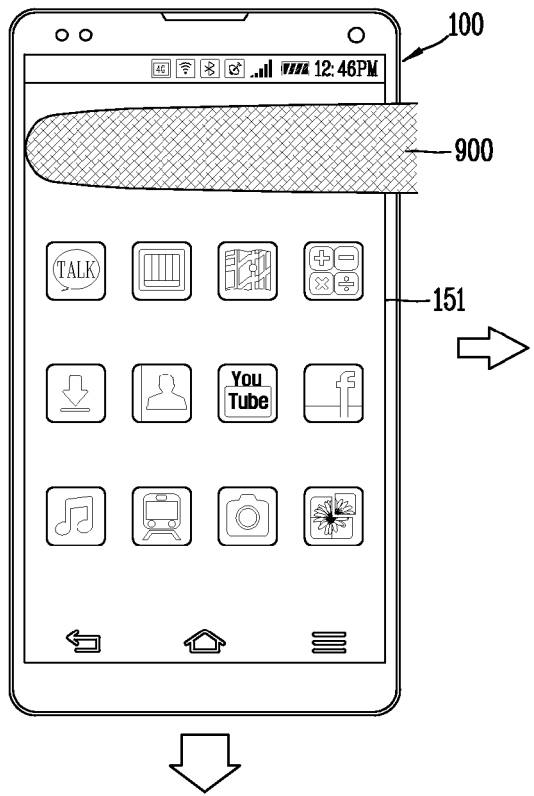
Figure 9B:
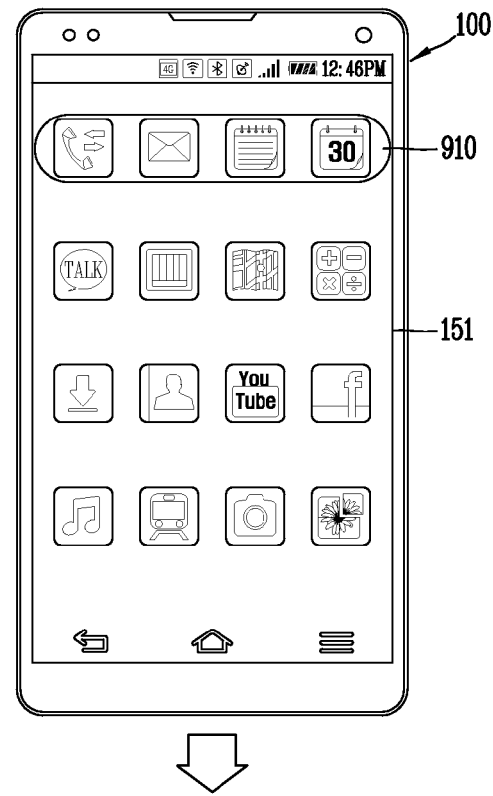
Figure 9D:
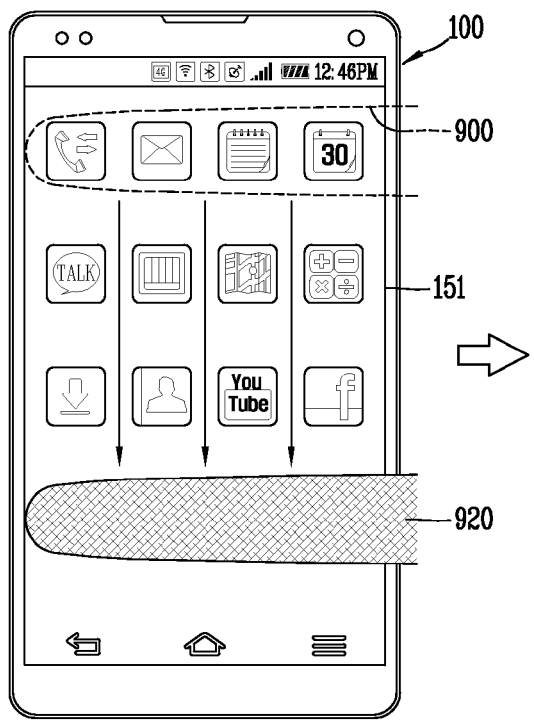
Figure 9C:
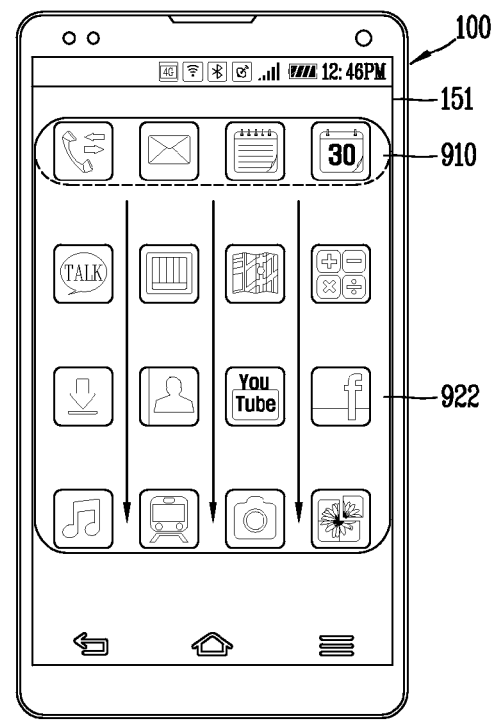

In this state, the controller 180 detects whether or not the touch object 900 with which the touch input is applied is moved. For example, in a case where the user moves the touch object 900, the controller 180, as illustrated in FIG. 9C, detects this. Then, as illustrated in FIG. 9(*d*), the region of the display unit 151 that the touch object 900 contacts while in motion is formed as a selection region 922. Then, the controller 180 selects the graphic objects that are included in the selection region 922, in response to the touch gesture for moving the touch object.

In this manner, in a case where the touch object, that is, the gloved finger with which the touch input is applied with the glove being worn on the user's hand is moved on the display unit 151, the controller 180 of the mobile terminal 100 according to the embodiment of the present invention selects the graphic objects that are included in a region of the display unit 151 that the gloved finger contacts while in motion.

On the other hand, in a case where the touch object is moved while making contact with the region of the display unit 151 such an extent that a contact area between the touch object and the region is a predetermined value or more, even though the touch object is (for example, the finger), the graphic objects that are displayed on the region corresponding to the area of the region of the display unit 151 that the touch object contacts while in motion, of course, are selected in response to the touch gesture for moving the touch object.

On the other hand, the controller 180 of the mobile terminal 100 according to the embodiment of the present invention, of course, may change a direction in which a screen is output to the display unit 151, differently according to the type of the identified touch object.

Figure 10A:
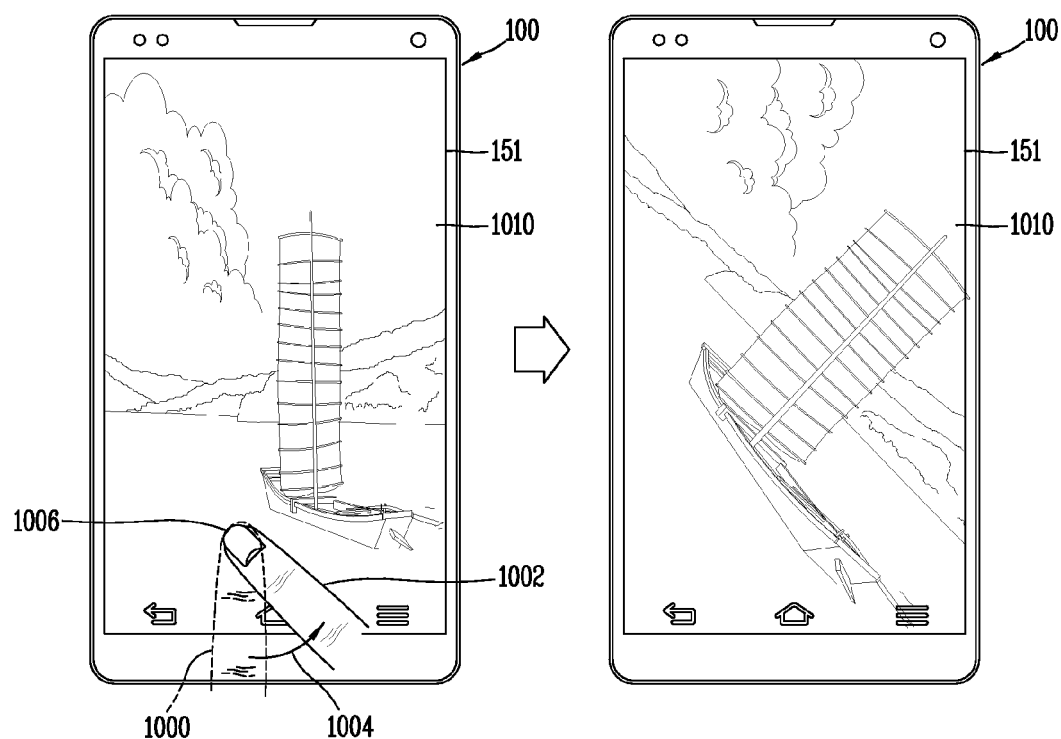
FIGS. 10A(a) and 10A(b) and 10B(a) and 10B(b) illustrate an example in which a direction in which a screen is output is changed according to the type of the touch object in the mobile terminal according to the embodiment of the present invention.

FIGS. 10A(a) and 10A(b) and 10B(a) and 10B(b) illustrate an example in which the direction in which the screen is output is changed according to the type of the touch object in the mobile terminal according to the embodiment of the present invention.

For example, in a case where, in a state where the touch input is applied with the touch object, the touch object rotates about a point at which the touch input is detected, the controller 180 changes the direction in which the screen is output to the display unit 151, in response to the rotating touch gesture.

For example, as illustrated in FIG. 10A(a), in a case where, in a state where a touch input 1000 is applied with the finger, the user makes a gesture that rotates about a point 1006 to which the touch input is applied, the controller 180 changes the direction in which the screen is output to the display unit 151, by an angle 1004 by which the touch input rotates. FIG. 10A(b) illustrates an example in which, in such a case, a direction in which video information 1010 is output to the display unit 151 is changed by the angle 1004 by which the touch input rotates. The "video information" here means visually-recognizable information that is output to the display unit 151, and the pieces of "video information" include graphic objects, such as various icons, and image information or text information, which are displayed in the display unit 151.

FIGS. 10A(a) and 10A(b) and 11B(a) and 11B(b) illustrates an example in which as an example of the "visual information," an image selected by the user is output.

On the other hand, in a case where the touch object with which the touch is applied is changed, the controller 180 performs a different function as illustrated in FIG. 10A(a). For example, as illustrated in FIG. 10B(a), in a case where, in a state where a touch input 1050 is applied with the gloved finger with the glove being worn on the user's hand, the user makes a gesture that rotates about a point 1056 to which the touch input is applied, the controller 180 changes the direction in which video information 1060 is output, by a predetermined angle.

In this case, regardless of an angle 1054 by which the touch input rotates, the controller 180 changes the outputting direction of the video information 1060 by the predetermined angle and outputs the resulting video information 1060. Therefore, when the predetermined angle is 90 degrees, in a case where the touch gesture that rotates about a specific point is applied with the gloved finger, with the glove being worn on the user's hand, the controller 180, as illustrated in FIG. 10B(b), may immediately change a display mode, in which the video information 1060 is output, from a landscape mode to a portrait mode or from the portrait mode to the landscape mode.

On the other hand, as described above, in a case where the touch inputs are applied with the multiple touch objects, the mobile terminal 100 according to the embodiment of the present invention performs a function that differs according to the touch input that is applied with each of the touch object.

For example, in a case where the touch input is detected that is applied with the touch object different from the touch object with which the current touch input is applied, the controller 180 performs a function that differs according to the touch gesture applied with the different touch object. For example, when, in a state where a specific function is performed in the mobile terminal 100, the touch input is applied with any one touch object, the controller 180 performs a function corresponding to such a touch object. Then, when, in this state, a new touch input is applied with a different touch object, the controller 180 performs a function corresponding to the different touch object. In addition, the function corresponding to the new touch input, of course, is determined according to the touch gesture with which the new touch input is applied.

Figure 11A:
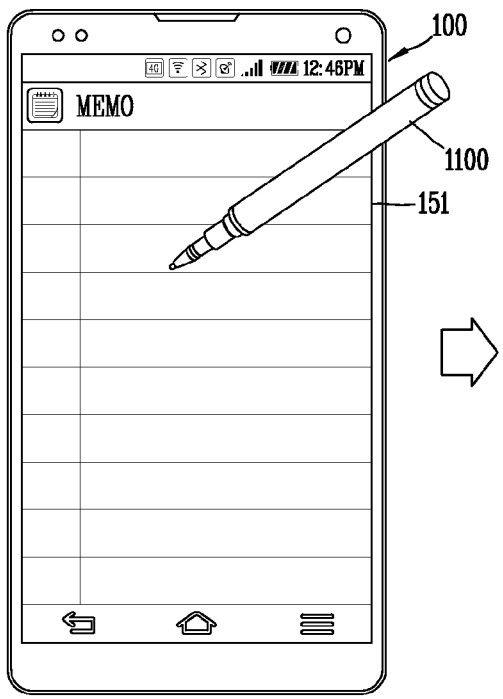
FIGS. 11A(a) to 11A(d) an 11B(a) to 11B(c) illustrate examples in which different functions are performed in a case where the touch inputs are applied with the multiple touch objects in the mobile terminal according to the embodiment of the present invention.
Figure 11A:
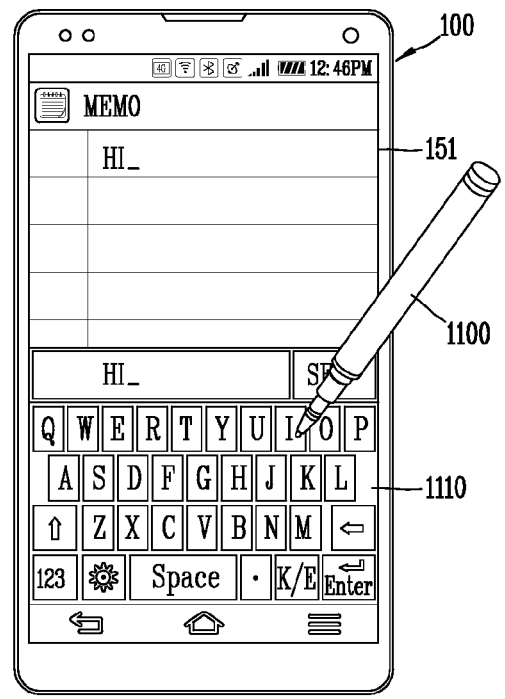
Figure 11A:
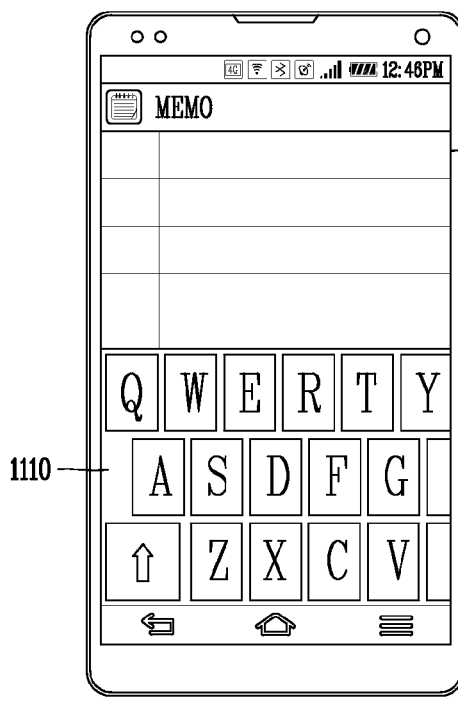
Figure 11A:
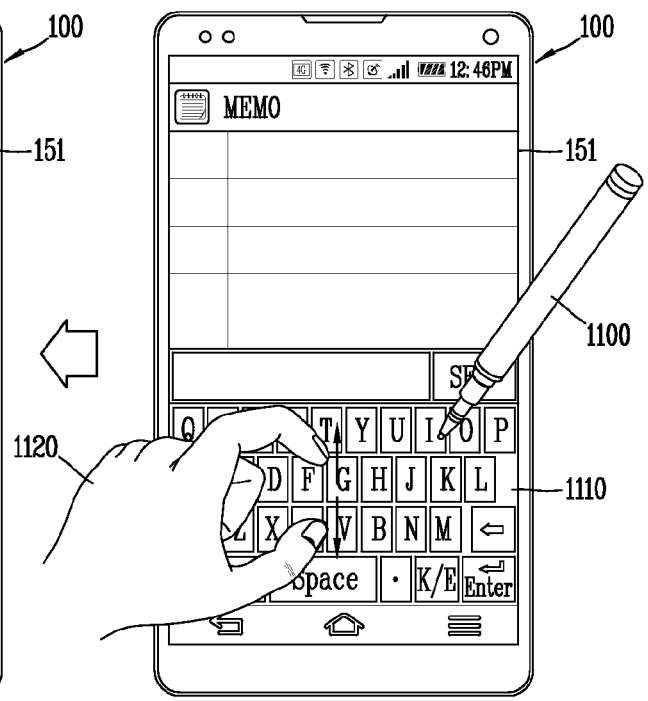

FIGS. 11A(a) to 11A(d) an 11B(a) to 11B(c) illustrate examples in which in such a case, different functions are performed in a case where the touch inputs are applied with the multiple touch objects in the mobile terminal according to the embodiment of the present invention.

First, referring to FIGS. 11A(a) to 11A(d), in a case where a memo function is performed in the mobile terminal 100, when the touch input, as illustrated in FIG. 11A(a), is applied with a touch pen 1100, the controller 180 performs a function corresponding to the identified touch pen 1100.

For example, the function corresponding to the touch pen 1100 may be a function of entering data on a QWERTY keypad. In this case, the controller 180, as illustrated in FIG. 11A(b), displays a QWERTY keypad screen 1110 on one region of the display unit 151, and receives a key input signal corresponding to the touch input applied with the touch pen 1100.

On the other hand, in this case, in a case where the touch input is applied with a different type of the touch object, the controller 180 additionally identifies the different type of the touch object. For example, as illustrated in FIG. 11A(c), in a case where the user applies a touch input 1120 with his/her finger, the controller 180 identifies the touch object with which the touch input is applied, and performs a function corresponding to the identified touch object.

For example, the touch input that is applied with the user's finger may be associated with a function of enlarging or reducing specific video information that is displayed on the display unit 151. In this case, the controller 180 enlarges or reduces the specific video information, based on the touch input 1120 that is applied with the user's finger.

That is, as illustrated in FIG. 11A(c), in a case where the user makes a pinch-out touch gesture 1120 with his/her fingers on the display unit 151 on which the QWERTY keypad screen 1110 is displayed, the controller 180 enlarges the QWERTY keypad screen 1100 on which the pinch-out touch gesture 1120 is detected, and displays the enlarged QWERTY keypad screen 1100 on the display unit 151. FIG. 11A(b) illustrates an example of this case.

On the other hand, a different function, of course, may be performed according to the touch gesture with which the touch input is applied. For example, the controller 180 may perform a scrolling function, based on the touch gesture by the user.

Figure 11B:
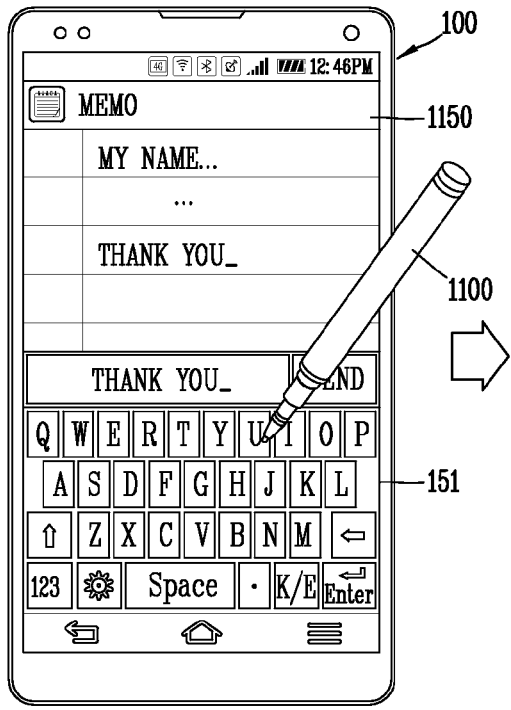
Figure 11B:
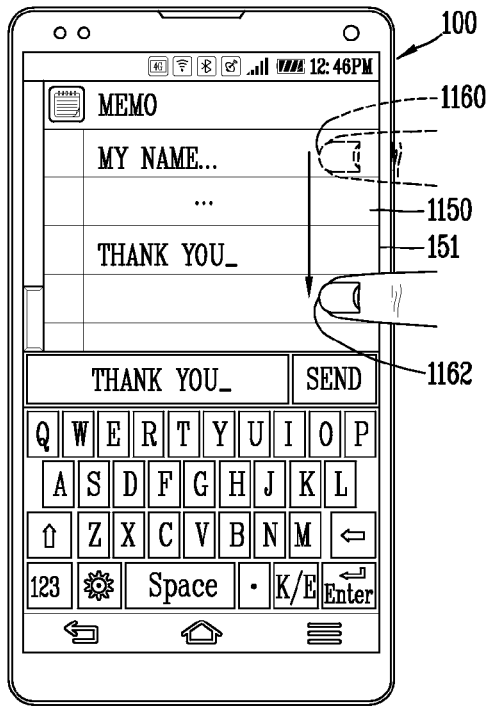
Figure 11B:
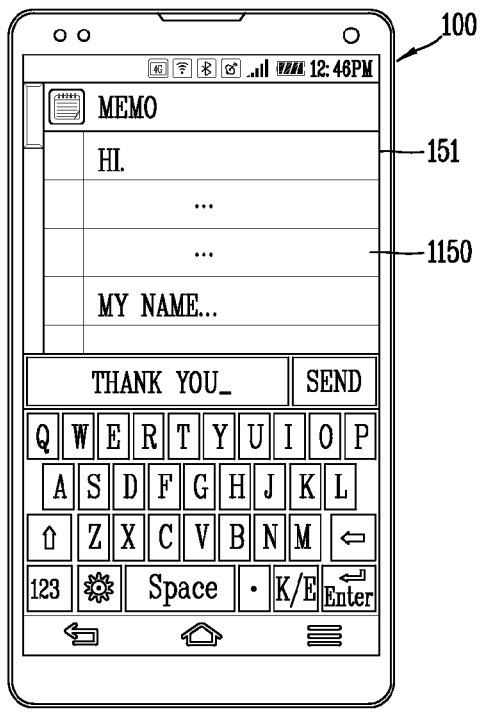

For example, as illustrated in FIG. 11B(a) to 11B(c), in a case where the memo function is performed in the mobile terminal 100, when the touch input, as illustrated in FIG. 11B(a), is applied with the touch pen 1100, the controller 180 performs a function corresponding to the identified touch pen 1100, that is, outputs the QWERTY keypad screen 1110. Then, the controller 180 performs a function of receiving a signal through the QWERTY keypad screen 1110.

In this case, in a case where, as illustrated in FIG. 11B(b), the user applies the touch input with a different touch object, that is, his/her finger, the controller 180 performs a function based on the touch gesture that is applied with the different touch object, in a state where the function (the function of receiving the signal through the QWERTY keypad screen 1110) that is performed through the touch pen 1100 remains activated.

For example, in a case where, as illustrated in FIG. 11B(b), the user makes a touch gesture in which a touch input is dragged from a first point 1160 to which the touch input is first applied to a second point 1162, the controller 180 provides the scrolling function in response to the touch gesture. In this case, in response to the touch gesture, the controller 180 displays a portion of a document screen 1150 that is currently created, which is scrolled according to the touch gesture, on the display unit 151. FIG. 11B(c) illustrates this example.

Therefore, in a case where the touch inputs that are applied with the multiple touch objects are detected at least at the same time, the controller 180 according to the embodiment of the present invention, identifies the type of the touch object and performs a function that differs according to the type of the identified touch object. Accordingly, in a state where a specific function is performed using a specific touch object, the user can use perform various functions without changing the touch object. Thus, the user can use the mobile terminal in a more convenient manner.

On the other hand, referring to FIGS. 11A(a) to 11A(d) and 11B(a) to 11B(c), the example is described above in which the function is performed that differs according to the touch inputs that are applied with only the different touch objects. Then, the different functions here, of course, are determined according to an operation state of the mobile terminal 100.

For example, FIGS. 11A(a) to 11A(d) and 11B(a) to 11B(c) assumes that a memo operation is performed on the mobile terminal 100. Accordingly, as examples, the controller 180 is described above as performing the function of receiving the input signal through the QWERTY keypad in the case where the touch input is applied with the touch pen, and as providing the function of enlarging or scrolling specific video information in the case where the touch input is applied with the user's finger. Therefore, in a case where the mobile terminal 100 is in an operation state (such as when the mobile terminal 100 reproduces a moving image or drives a camera), the controller 180, of course, may perform a function corresponding to the current operation state of the mobile terminal 100, which differs according to the type of the touch object with which the touch input is applied.

On the other hand, as described above, the different touch input methods that are provided according to the types of the touch objects mean the different signal input means, or the different touch gestures for a specific function, or the different touch gestures for the same or similar function.

However, additionally, the different touch input methods mean different user interfaces. Then, the user interface differs in at least one, among a method of selecting at least one or more among the graphic objects that are displayed on the display unit 151, a method of displaying the graphic objects, a method of inputting characters, and a function corresponding to the touch input.

In addition, the controller 180 of the mobile terminal 100 according to the embodiment of the present invention determines not only the type of the touch object, but also the user interface that is provided, based on a surrounding situation of the mobile terminal 100. For example, the controller 180 detects a position of the mobile terminal 100, and provides the corresponding user interface according to the detected position and the type of the identified touch object.

For example, in a case where the mobile terminal 100 is currently in a vehicle, the controller 180 provides the user interface corresponding to the result of identifying the touch object with which the touch input is applied to the display unit 151 and a case where the mobile terminal 100 is in the vehicle. That is, in a case where it is determined that the mobile terminal 100 is currently in the vehicle, the controller 180 identifies the touch object. Then, in a case where the touch input is applied with the gloved finger with the glove being worn on the user's hand, the controller 180 provides the user with the user interface through which information on item selected by him/her is output, in the form of a sound signal (for example, a beep), in order for him/her to check whether he/she correctly selects the item. In addition, in the case where the user applies the touch input with his/her finger, instead of outputting the sound signal, the controller 180 generates vibration in order for the user to check whether he/she correctly selects the item. In addition, in a case where the touch object with which the touch input is applied is the touch pen, considering the fact that the mobile terminal 100 is currently in the vehicle, the controller 180 may enlarge the information on the item selected by the user than the pieces of video information that are displayed on the display unit, and displays the enlarged information.

On the other hand, as an example of a specific function corresponding to the touch gesture, the function of selecting the multiple graphic objects is described above, but this is only an embodiment of the present invention. The present invention, of course, is not limited to this. That is, various functions of the mobile terminal, which are not described, correspond to type-touch gesture that differs according to the types of the identified touch objects. Accordingly, the various functions may be performed in different methods.

Effects of the mobile terminal according to the present invention and the method of controlling the mobile terminal are as follows.

According to at least one among the embodiments of the present invention, the type of the touch object is identified, and the touch input method corresponding to the identified touch object is provided. Thus, an advantage is provided that enables the user to correctly input a desired signal into the mobile terminal regardless of the type of the touch object.

In addition, according to at least one among the embodiments of the present invention, the input type that differs according to the type of the identified touch object is provided. Thus, an advantage is provided that enables the user to control various functions of the mobile terminal in a more convenient manner according to the type of the touch object that is used by him/her.

According to the embodiment of the present invention, the method described above may be realized by being stored as processor-readable codes on a program-stored medium. The computer-readable media include all types of recording devices that store data that is readable by a computer system. A hard disk drive (HDD), a solid state disk (SSD), a silicon disk drive (SDD), a ROM, a RAM, a CD-ROM, a magnetic tape, a floppy disk, an optical data storage device and the like are examples of the computer-readable medium, and the computer-readable medium may be realized in the form of a carrier wave (for example, transmission over the Internet). In addition, the computer may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a memory;
   a touch screen; and
   a processor operably coupled to the memory and the touch screen, and configured to:
   detect a touch input applied to the touch screen;
   determine whether the touch input is continuously applied for a predetermined time;
   identify a type of a touch object contacting the touch screen to apply the touch input when the touch input is continuously applied for at least the predetermined time;
   provide a touch input mechanism according to the identified type of the touch object,
   wherein:
      a first touch input mechanism is provided when a first type of the touch object is identified, the first touch input mechanism including a first touch gesture corresponding to a specific function; and
      a second touch input mechanism is provided when a second type of the touch object is identified, the second touch input mechanism including a second touch gesture corresponding to the specific function; and
   perform the specific function in response to the first or second touch gesture applied using the identified first or second type, respectively, of the touch object according to the first or second touch input mechanism, respectively,
   wherein the first touch gesture and the second touch gesture both corresponding to the specific function are different touch gestures, and
   wherein the type of the touch object is identified based on at least:
      a strength of a signal that is generated by the touch input; or
      a size of an area on the touch screen that is in contact with the touch object, wherein the processor is further configured to:
change an orientation of a screen displayed on the touch screen in response to the touch input; and
determine a mechanism for changing the orientation of the screen displayed on the touch screen based on the type of the identified touch object used to apply the touch input,
wherein:
the orientation is changed according to an angle indicated by the touch input when the touch input is applied with the first type of the touch object; and
the orientation is changed according to a predetermined angle when the touch input is applied with the second type of the touch object regardless of an angle indicated by the touch input applied with the second type of the touch object.

2. The mobile terminal of claim 1, wherein:
the touch object comprises a finger, a touch pen, and a gloved finger;
the touch input mechanism is provided differently for each or at least two of the finger, the touch pen, or the gloved finger such that at least two different touch input mechanisms are provided based on whether the touch input is applied with the finger, the touch pen, or the gloved finger; and
the processor is further configured to select a plurality of graphic objects displayed on the touch screen based on the touch input mechanism provided differently according to the identified type of the touch object.

3. The mobile terminal of claim 2, wherein:
the touch input is applied with the gloved finger; and
the processor is further configured to select the plurality of graphic objects that is displayed in the vicinity of a point on the touch screen to which the touch input is applied based on a duration of the touch input such that a number of the selected at least one graphic object increases as the duration increases.

4. The mobile terminal of claim 2, wherein:
the touch input is applied with the gloved finger; and
the processor is further configured to select all graphic objects positioned in a same column or same row as a graphic object that is touched by the gloved finger when the touch input is applied,
wherein the graphic objects are icons, each icon indicating a different application or program.

5. The mobile terminal of claim 2, wherein:
the touch input is applied with the gloved finger; and
the processor is further configured to select the plurality of graphic objects that is displayed in the vicinity of a centerline of an area of the touch screen on which the touch input is applied based on a duration of the touch input such that a number of the selected at least one graphic object increases as the duration increases.

6. The mobile terminal of claim 2, wherein:
the touch input is applied with the gloved finger that is moved on the touch screen; and
the processor is further configured to select the plurality of graphic objects that is displayed on an area of the touch screen that is touched by the moving gloved finger when the touch input is applied.

7. The mobile terminal of claim 2, wherein:
the touch input is applied with the touch object that is moved on the touch screen; and
the processor is further configured to select the plurality of graphic objects in response to the movement of the touch object regardless of the type of the touch object when a size of an area of the touch screen that is touched by the moving touch object is equal to or greater than a predetermined size value.

8. The mobile terminal of claim 1, wherein:
the touch input is applied with two or more different types of touch objects such that multiple touch inputs are applied; and
the processor is further configured to perform a function corresponding to each of the two or more touch objects.

9. The mobile terminal of claim 8, wherein the processor is further configured to perform a different function corresponding to each of the two or more touch objects based on an operation state of the mobile terminal such that two different functions are performed in response to two different touch inputs applied with a same touch object in two different operation states.

10. The mobile terminal of claim 1, wherein the processor is further configured to cause the touch screen to display a user interface corresponding to the identified type of the touch object such that different user interfaces are displayed for different types of touch objects.

11. The mobile terminal of claim 10, wherein the user interface is associated with at least a method of selecting at least one of a plurality of graphic objects that are displayed on the touch screen, a method of displaying the plurality of graphic objects, or a method of inputting characters.

12. The mobile terminal of claim 10, further comprising a sensor configured to collect information related to surrounding environment,
wherein the processor is further configured to cause the touch screen to display the user interface based on the collected information.

13. The mobile terminal of claim 1, wherein the processor is further configured to:
determine both the strength of the signal and the size of the area in response to the touch input;
determine whether the signal is due to a noise based on the determined strength and size; and
filter out the signal if the signal is generated due to the noise.

14. The mobile terminal of claim 1, wherein:
the touch object comprises a finger, a touch pen, and a gloved finger; and
the processor is further configured to:
determine the strength of the signal in response to the touch input; and
identify whether the touch object is the gloved finger based on the determined strength of the signal.

15. The mobile terminal of claim 14, wherein the processor is further configured to identify the touch object as the finger or the touch pen based on the size of the area when the touch object is not identified as the gloved finger.

16. The mobile terminal of claim 14, wherein the processor is further configured to:
identify the touch object as the gloved finger based on the strength of the signal;
identify a type of a glove; and
control a condition for detecting the touch input according to the identified type of the glove.

17. A method of controlling a mobile terminal comprising a touch screen, the method comprising:
detecting a touch input applied to the touch screen;
determining whether the touch input is continuously applied for a predetermined time;
identifying a type of a touch object contacting the touch screen to apply the touch input when the touch input is continuously applied for at least the predetermined time;

providing a touch input mechanism according to the identified type of the touch object, wherein:
- a first touch input mechanism is provided when a first type of the touch object is identified, the first touch input mechanism including a first touch gesture corresponding to a specific function; and
- a second touch input mechanism is provided when a second type of the touch object is identified, the second touch input mechanism including a second touch gesture corresponding to the specific function;

performing the specific function in response to the first or second touch gesture applied using the identified first or second type, respectively, of the touch object according to the first or second touch input mechanism, respectively, wherein the first touch gesture and the second touch gesture both corresponding to the specific function are different touch gestures, and wherein the type of the touch object is identified based on at least:
- a strength of a signal that is generated by the touch input; or
- a size of an area on the touch screen that is in contact with the touch object;

changing an orientation of a screen displayed on the touch screen in response to the touch input; and determining a mechanism for changing the orientation of the screen displayed on the touch screen based on the type of the identified touch object used to apply the touch input, wherein:
- the orientation is changed according to an angle indicated by the touch input when the touch input is applied with the first type of the touch object; and
- the orientation is changed according to a predetermined angle when the touch input is applied with the second type of the touch object regardless of an angle indicated by the touch input applied with the second type of the touch object.

18. The method of claim 17, wherein:

the touch object comprises a finger, a touch pen, and a gloved finger;

the touch input mechanism is provided differently for each or at least two of the finger, the touch pen, or the gloved finger such that at least two different touch input mechanisms are provided based on whether the touch input is applied with the finger, the touch pen, or the gloved finger; and the method further comprises selecting a plurality of graphic objects displayed on the touch screen based on the touch input mechanism provided differently according to the identified type of the touch object.

19. The mobile terminal of claim 1, wherein the processor is further configured to perform a function that differs according to the identified type of the touch object when a same touch gesture is applied using a different type of the touch object.

* * * * *